US011677756B2

(12) United States Patent
Ford

(10) Patent No.: US 11,677,756 B2
(45) Date of Patent: *Jun. 13, 2023

(54) RISK ADAPTIVE PROTECTION

(71) Applicant: Forcepoint, LLC, Austin, TX (US)

(72) Inventor: Richard A. Ford, Austin, TX (US)

(73) Assignee: Forcepoint LLC, Austin, TX (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/330,530

(22) Filed: May 26, 2021

(65) Prior Publication Data

US 2021/0297425 A1 Sep. 23, 2021

Related U.S. Application Data

(63) Continuation of application No. 16/533,238, filed on Aug. 6, 2019, now Pat. No. 11,025,646, which is a (Continued)

(51) Int. Cl.
*H04L 9/40* (2022.01)
*G06F 21/55* (2013.01)
(Continued)

(52) U.S. Cl.
CPC ............ *H04L 63/14* (2013.01); *G06F 21/554* (2013.01); *G06F 21/57* (2013.01); *G06F 21/604* (2013.01);
(Continued)

(58) Field of Classification Search
CPC ..... H04L 63/14; H04L 9/3239; H04L 63/102; H04L 63/1408; H04L 63/1425;
(Continued)

(56) References Cited

U.S. PATENT DOCUMENTS 7,895,448 B1   2/2011  Satish
8,122,122 B1   2/2012  Clingenpeel et al.
(Continued)

OTHER PUBLICATIONS symantec.com, Which tuning is available for improving the performance of Symantec Endpoint Protection clients during scan, https://support.symantec.com/en_US/article.TECH143941.html, Jan. 6, 2011.
(Continued)

*Primary Examiner* — Darren B Schwartz
(74) *Attorney, Agent, or Firm* — Terrile Cannatti & Chambers; Stephen A. Terrile

(57) ABSTRACT

A method, system and computer-usable medium for generating a user behavior profile, comprising: monitoring user interactions between a user and an information handling system; converting the user interactions and the information about the user into electronic information representing the user interactions; generating a unique user behavior profile based upon the electronic information representing the user interactions and the information about the user; storing information relating to the unique user behavior profile within a user behavior profile repository; and, storing information referencing the unique user behavior profile in a user behavior blockchain.

17 Claims, 10 Drawing Sheets

Related U.S. Application Data continuation of application No. 16/162,655, filed on Oct. 17, 2018, now Pat. No. 10,530,786, which is a continuation-in-part of application No. 15/963,729, filed on Apr. 26, 2018, now Pat. No. 10,129,269, which is a continuation-in-part of application No. 15/878,898, filed on Jan. 24, 2018, now Pat. No. 10,063,568, which is a continuation of application No. 15/720,788, filed on Sep. 29, 2017, now Pat. No. 9,882,918.

(60) Provisional application No. 62/506,300, filed on May 15, 2017.

(51) Int. Cl.
| | | |
|---|---|---|
| *G06F 21/57* | (2013.01) | |
| *G06F 21/60* | (2013.01) | |
| *G06F 21/62* | (2013.01) | |
| *G06N 5/04* | (2023.01) | |
| *H04L 9/32* | (2006.01) | |
| *H04L 67/306* | (2022.01) | |
| *H04L 67/50* | (2022.01) | |
| *H04L 9/00* | (2022.01) | |

(52) U.S. Cl.
CPC ........... *G06F 21/6218* (2013.01); *G06N 5/04* (2013.01); *H04L 9/3239* (2013.01); *H04L 63/102* (2013.01); *H04L 63/1408* (2013.01); *H04L 63/1425* (2013.01); *H04L 63/205* (2013.01); *H04L 67/306* (2013.01); *H04L 67/535* (2022.05); *G06F 2221/2101* (2013.01); *G06F 2221/2141* (2013.01); *H04L 9/50* (2022.05)

(58) Field of Classification Search
CPC ... H04L 63/205; H04L 67/306; H04L 67/535; H04L 9/50; H04L 63/10; G06F 21/554; G06F 21/57; G06F 21/604; G06F 21/6218; G06F 2221/2101; G06F 2221/2141; G06N 5/04
See application file for complete search history.

(56) References Cited

U.S. PATENT DOCUMENTS

| | | | |
|---|---|---|---|
| 8,613,108 | B1 | 12/2013 | Aggarwal |
| 9,246,944 | B1 | 1/2016 | Chen |
| 9,268,947 | B1 | 2/2016 | Jarlstrom et al. |
| 9,275,065 | B1 | 3/2016 | Ganesh et al. |
| 9,301,140 | B1 | 3/2016 | Costigan et al. |
| 10,003,607 | B1* | 6/2018 | Koi .................... H04L 63/1408 |
| 10,025,952 | B1 | 7/2018 | Wang et al. |
| 10,049,227 | B1 | 8/2018 | Sampson |
| 10,057,227 | B1 | 8/2018 | Hess et al. |
| 10,142,308 | B1 | 11/2018 | Duchin et al. |
| 10,320,813 | B1 | 6/2019 | Ahmed et al. |
| 10,440,029 | B2 | 10/2019 | Hidden et al. |
| 10,574,683 | B1* | 2/2020 | Ghosh ................ H04L 63/1425 |
| 2002/0143961 | A1 | 10/2002 | Siegel et al. |
| 2002/0173295 | A1 | 11/2002 | Nykanen et al. |
| 2003/0188191 | A1 | 10/2003 | Aaron et al. |
| 2004/0078595 | A1 | 4/2004 | Kent et al. |
| 2004/0236945 | A1 | 11/2004 | Risan et al. |
| 2005/0071282 | A1 | 3/2005 | Lu et al. |
| 2005/0183143 | A1 | 8/2005 | Anderholm et al. |
| 2006/0034305 | A1 | 2/2006 | Heimerdinger et al. |
| 2006/0120526 | A1 | 6/2006 | Boucher et al. |
| 2006/0224898 | A1 | 10/2006 | Ahmed |
| 2006/0259950 | A1 | 11/2006 | Mattsson |
| 2007/0067853 | A1 | 3/2007 | Ramsey |
| 2007/0124601 | A1 | 5/2007 | Singh et al. |
| 2008/0052288 | A1 | 2/2008 | Flinn et al. |
| 2008/0147554 | A1 | 6/2008 | Stevens et al. |
| 2008/0204788 | A1 | 8/2008 | Kelly et al. |
| 2008/0271143 | A1 | 10/2008 | Stephens et al. |
| 2009/0144619 | A1 | 6/2009 | Best et al. |
| 2009/0150814 | A1 | 6/2009 | Eyer et al. |
| 2009/0158441 | A1 | 6/2009 | Mohler et al. |
| 2009/0164878 | A1 | 6/2009 | Cottrille |
| 2009/0276623 | A1 | 11/2009 | Jevans et al. |
| 2009/0293121 | A1 | 11/2009 | Bigus et al. |
| 2010/0014676 | A1 | 1/2010 | McCarthy et al. |
| 2010/0121929 | A1* | 5/2010 | Lin ........................ H04L 67/535 726/1 |
| 2010/0169971 | A1 | 7/2010 | Raviv |
| 2010/0205667 | A1 | 8/2010 | Anderson et al. |
| 2011/0099602 | A1 | 4/2011 | Apparao et al. |
| 2011/0173084 | A1 | 7/2011 | Cheng et al. |
| 2011/0239113 | A1 | 9/2011 | Hung et al. |
| 2011/0320816 | A1 | 12/2011 | Yao et al. |
| 2012/0030411 | A1 | 2/2012 | Wang et al. |
| 2012/0047575 | A1* | 2/2012 | Baikalov ............... G06F 21/604 726/21 |
| 2012/0137367 | A1 | 5/2012 | Dupont et al. |
| 2013/0054976 | A1 | 2/2013 | Brown et al. |
| 2013/0091085 | A1 | 4/2013 | Sohn et al. |
| 2013/0097701 | A1 | 4/2013 | Moyle et al. |
| 2013/0097709 | A1* | 4/2013 | Basavapatna ....... H04L 63/1441 726/25 |
| 2013/0111220 | A1 | 5/2013 | Friedlander et al. |
| 2013/0167192 | A1 | 6/2013 | Hickman et al. |
| 2013/0167245 | A1 | 6/2013 | Birtwhistle et al. |
| 2013/0268740 | A1 | 10/2013 | Holt |
| 2013/0305359 | A1 | 11/2013 | Gathala et al. |
| 2014/0007186 | A1 | 1/2014 | Agrawal et al. |
| 2014/0096215 | A1 | 4/2014 | Hessler |
| 2014/0189784 | A1 | 7/2014 | Marino et al. |
| 2014/0237595 | A1 | 8/2014 | Sridhara et al. |
| 2014/0289875 | A1 | 9/2014 | Knafel |
| 2014/0331279 | A1 | 11/2014 | Aissi et al. |
| 2014/0337972 | A1* | 11/2014 | Foster ................ H04L 63/1441 726/22 |
| 2014/0359777 | A1* | 12/2014 | Lam ...................... G06F 21/577 726/25 |
| 2015/0082032 | A1 | 3/2015 | Bruce et al. |
| 2015/0082441 | A1 | 3/2015 | Gathala et al. |
| 2015/0106888 | A1 | 4/2015 | Cheng et al. |
| 2015/0195300 | A1 | 7/2015 | Adjaoute |
| 2015/0229665 | A1* | 8/2015 | Foster ................ H04L 63/1441 726/22 |
| 2015/0244821 | A1 | 8/2015 | Burger |
| 2015/0271207 | A1 | 9/2015 | Jaiswal et al. |
| 2015/0324563 | A1 | 11/2015 | Deutschmann et al. |
| 2015/0358317 | A1 | 12/2015 | Deutschmann et al. |
| 2016/0021141 | A1* | 1/2016 | Liu ...................... H04L 63/1425 726/23 |
| 2016/0143570 | A1 | 5/2016 | Valacich et al. |
| 2016/0147945 | A1 | 5/2016 | MacCarthy et al. |
| 2016/0224800 | A1 | 8/2016 | Bellert |
| 2016/0234174 | A1 | 8/2016 | Zizi et al. |
| 2016/0239668 | A1 | 8/2016 | Bellert |
| 2016/0241554 | A1 | 8/2016 | Zizi et al. |
| 2016/0366167 | A1* | 12/2016 | Yumer .................... G06F 21/50 |
| 2016/0371476 | A1 | 12/2016 | Turgeman et al. |
| 2017/0032248 | A1 | 2/2017 | Dotan-Cohen et al. |
| 2017/0085534 | A1 | 3/2017 | Iyer et al. |
| 2017/0118239 | A1* | 4/2017 | Most ..................... H04L 63/168 |
| 2017/0134412 | A1 | 5/2017 | Cheng et al. |
| 2017/0161525 | A1 | 6/2017 | Vieira et al. |
| 2017/0251007 | A1 | 8/2017 | Fujisawa et al. |
| 2017/0272472 | A1 | 9/2017 | Adhar |
| 2017/0286671 | A1 | 10/2017 | Chari et al. |
| 2017/0366348 | A1 | 12/2017 | Weimer et al. |
| 2018/0041503 | A1 | 2/2018 | Lindemann |
| 2018/0174493 | A1 | 6/2018 | Ohori et al. |
| 2018/0288070 | A1* | 10/2018 | Price ....................... G06F 8/31 |

(56) References Cited

U.S. PATENT DOCUMENTS

2019/0036971 A1* 1/2019 Ford ................. H04L 67/025
2019/0318100 A1* 10/2019 Bhatia ................ G06F 21/57

OTHER PUBLICATIONS microsoft.com, Windows Search Overview, https://msdn.microsoft.com/en-us/library/windows/desktop/aa965362, printed Nov. 20, 2017.
Stephen G. Dimmock et al., Is Fraud Contagious? Co-Worker Influence on Misconduct by Financial Advisers, The Journal of Finance, first published online Feb. 3, 2018.

* cited by examiner

RISK ADAPTIVE PROTECTION

BACKGROUND OF THE INVENTION

Field of the Invention

The present invention relates in general to the field of computers and similar technologies, and in particular to software utilized in this field. Still more particularly, it relates to a method, system and computer-usable medium for managing blockchain access to user profile information.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

Various approaches to detecting such threats include performing user profiling operations to infer the intent of a user's actions. The results of such profiling operations are often stored in a user profile, which is in turn may be used as a reference point to compare current user behavior to past activities. However, the information contained in such a user profile poses a risk, as it could be utilized by a malicious actor to impersonate the user for illicit purposes.

SUMMARY OF THE INVENTION

A method, system and computer-usable medium are disclosed for generating a cyber behavior profile, comprising: monitoring user interactions between a user and an information handling system; converting the user interactions and the information about the user into electronic information representing the user interactions; generating a unique cyber behavior profile based upon the electronic information representing the user interactions and the information about the user; storing information relating to the unique user behavior profile within a user behavior profile repository; and, storing information referencing the unique cyber behavior profile in a cyber behavior blockchain.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
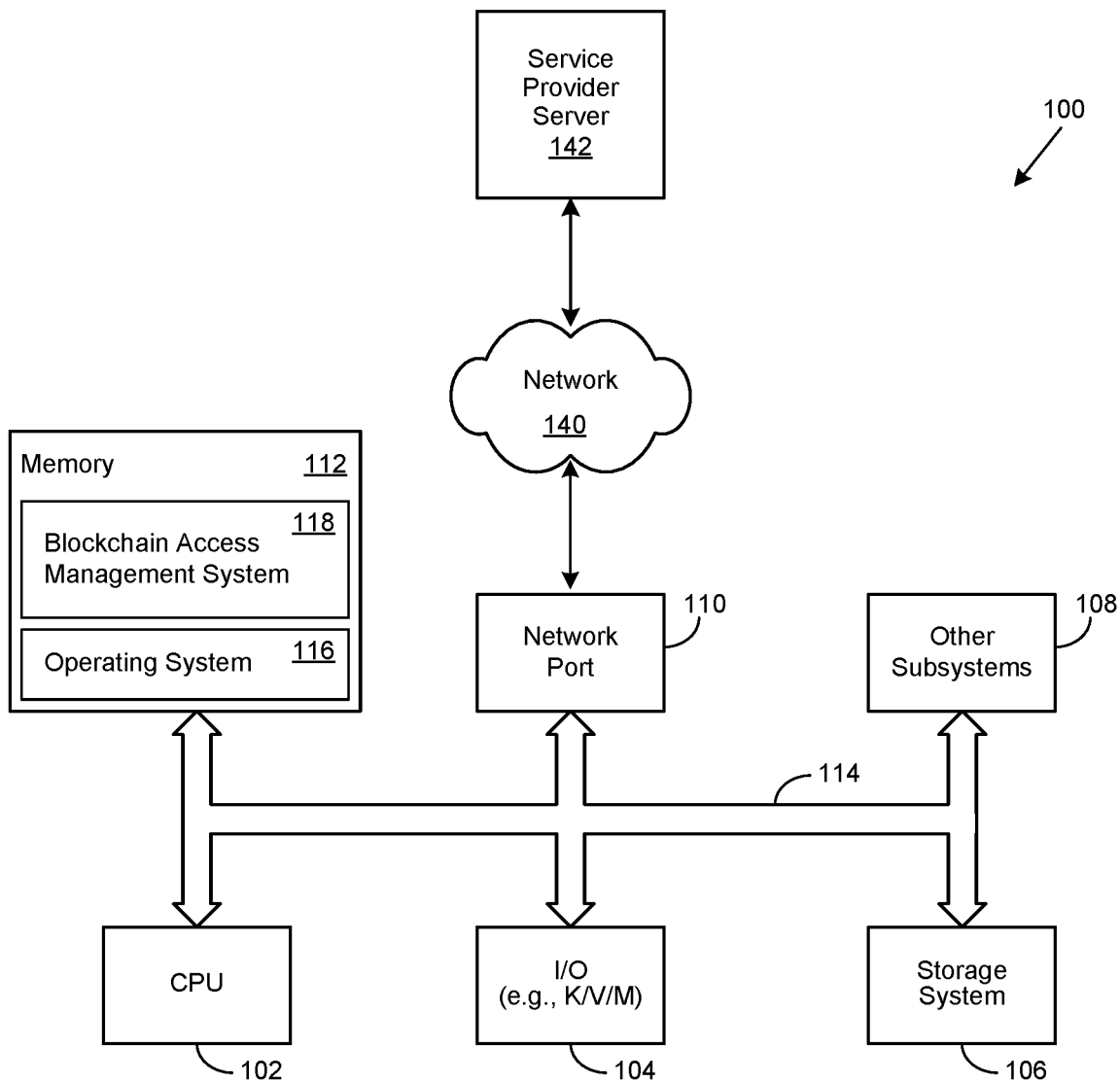
FIG. 1 depicts an exemplary client computer in which the present invention may be implemented.

A method, system and computer-usable medium are disclosed for managing blockchain access to user profile information. Certain aspects of the invention include an appreciation that identity information associated with a user can be stored in a blockchain data structure familiar to those of skill in the art. Certain aspects of the invention likewise include an appreciation that such blockchain approaches, as typically implemented, include encrypting the contents of the blockchain to ensure their confidentiality. Likewise, certain aspects of the invention include an appreciation that given sufficient time and resources, the results of such encryption can be decrypted.

Certain aspects of the invention likewise reflect an appreciation that blockchains are typically implemented as a distributed transaction database, and decryption of the contents of one transaction block of a blockchain is generally of little value. However, decrypting the contents of a blockchain block containing a user's identity information, such as user identifiers and passwords, poses a potential security liability. Likewise, the identity information may include certain personal information associated with a user.

Furthermore, certain aspects of the invention reflect an appreciation that a user may wish for such personal information to be made inaccessible, whether in part or in its entirety. Moreover, various aspects of the invention reflect an appreciation that a user may wish for certain personal information to be deleted or "forgotten." Consequently, certain aspects of the invention reflect an appreciation that while various blockchain approaches are advantageous in proving the authenticity of a user, it may not be advisable for them to contain certain identity, behavior, or personal information associated with a user.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a blockchain access management system 118. In one embodiment, the information handling system 100 is able to download the blockchain access management system 118 from the service provider server 142. In another embodiment, the blockchain access management system 118 is provided as a service from the service provider server 142.

In various embodiments, the blockchain access management system 118 performs one or more operations for managing the use of a blockchain to access to a cyberprofile or other sensitive private information (SPI), described in greater detail herein. In certain embodiments, the management of blockchain access to a cyberprofile or other SPI improves processor efficiency, and thus the efficiency of the information handling system 100, by automating the management of blockchain access. As will be appreciated, once the information handling system 100 is configured to manage blockchain access, the information handling system 100 becomes a specialized computing device specifically configured to manage blockchain access and is not a general purpose computing device. Moreover, the implementation of the blockchain access management system 118 on the information handling system 100 improves the functionality of the information handling system 100 and provides a useful and concrete result of managing blockchain access to cyberprofiles and other SPI.

Figure 2:
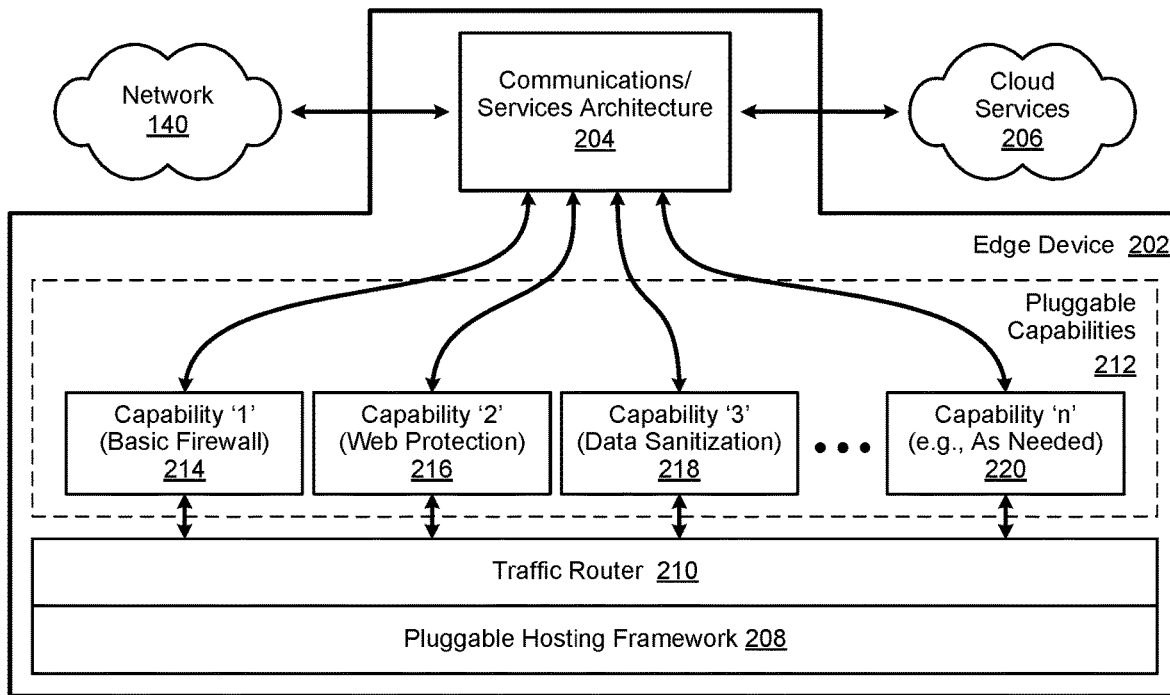
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
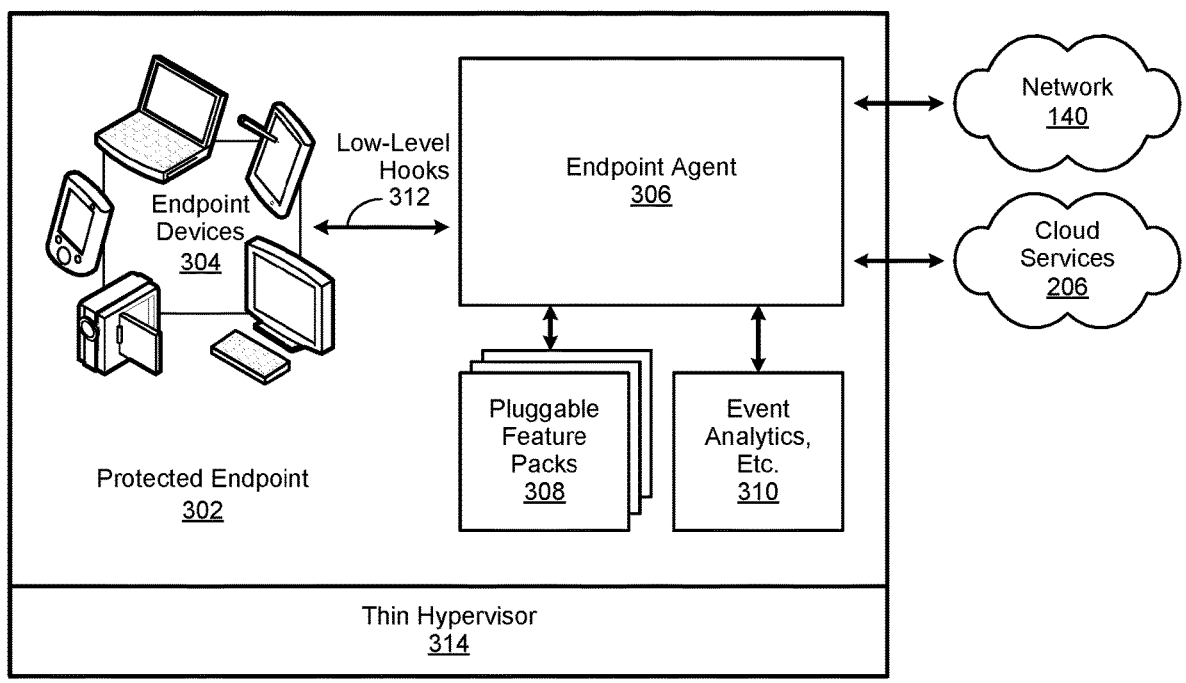
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with accessing user profile information via a blockchain, as described in greater detail herein. In certain embodiments, the protected endpoint 302 may be implemented to provide temporal information, such as timestamp information, associated with such operations.

In certain embodiments, accessing user profile information may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm, such as speaking, gesturing, facial patterns or expressions, walking, geolocation and so forth. More particularly, physical behavior may include any action enacted by a user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be observed through the use of an electronic device (e.g., an electronic sensor), a computing device or system (e.g., an endpoint device 304), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various user identity resolution factors, such as personal information associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with accessing user profile information, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
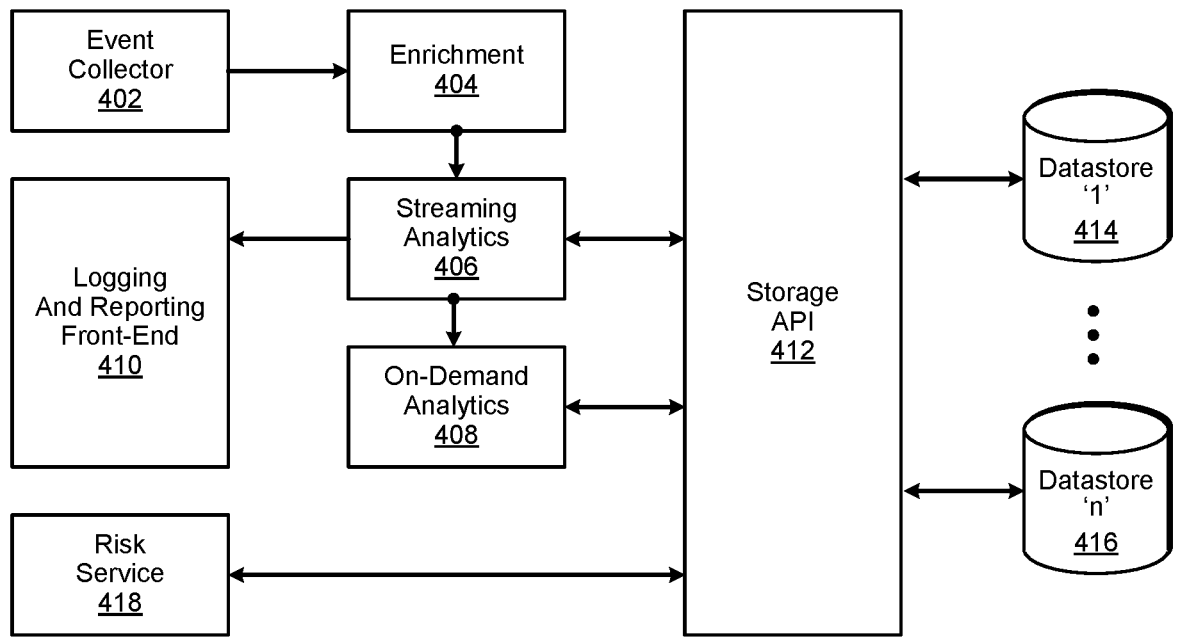
FIG. 4 is a simplified block diagram of a security analytics system.

FIG. 4 is a simplified block diagram of a security analytics system implemented in accordance with an embodiment of the invention. In certain embodiments, the security analytics system shown in FIG. 4 may be implemented to provide log storage, reporting, and analytics capable of performing streaming 406 and on-demand 408 analytics operations. In certain embodiments, such operations may be associated with accessing user profile information, as described in greater detail herein. In certain embodiments, the security analytics system may be implemented to provide a uniform platform for storing events and contextual information associated with various user behaviors and performing longitudinal analytics.

As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular time period or at a particular point in time, may represent suspicious user behavior.

In certain embodiments, the security analytics system may be implemented to be scalable. In certain embodiments, the security analytics system may be implemented in a centralized location, such as a corporate data center. In these embodiments, additional resources may be added to the security analytics system as needs grow. In certain embodiments, the security analytics system may be implemented as a distributed system. In these embodiments, the security analytics system may span multiple information processing systems. In certain embodiments, the security analytics system may be implemented in a cloud environment. In certain embodiments, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 402 may be implemented to collect event and contextual information, described in greater detail herein, associated with various user behaviors. In these embodiments, the method by which the event and contextual information collected by the event collector 402 is selected to be collected is a matter of design choice. In certain embodiments, the event and contextual information collected by the event collector 402 may be processed by an enrichment module 404 to generate enriched user behavior information. In certain embodiments, the enrichment may include certain contextual information related to a particular user behavior. In certain embodiments, the enrichment may include certain temporal information, such as timestamp information, related to a particular user behavior.

In certain embodiments, enriched user behavior information may be provided by the enrichment module 404 to a streaming 406 analytics module. In turn, the streaming 406 analytics module may provide some or all of the enriched user behavior information to an on-demand 408 analytics module. As used herein, streaming 406 analytics broadly refers to analytics performed in near real-time on enriched user behavior information as it is received. Likewise, on-demand 408 analytics broadly refers herein to analytics performed, as it is requested, on enriched user behavior information after it has been received.

In certain embodiments, the on-demand 408 analytics may be performed on enriched user behavior associated with a particular interval of, or point in, time. In certain embodiments, the streaming 406 or on-demand 408 analytics may be performed on enriched user behavior associated with a particular user, group of users, one or more entities, or a combination thereof. In certain embodiments, the streaming 406 or on-demand 408 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 406 or on-demand 408 analytics modules may be provided to a storage Application Program Interface (API) 412. In turn, the storage API 412 may be implemented to provide access to various datastores '1' 414 through 'n' 416, which in turn are used to store the results of the analytics operations. In certain embodiments, the security analytics system may be implemented with a logging and reporting front-end 410, which is used to receive the results of analytics operations performed by the streaming 406 analytics module. In certain embodiments, the datastores '1' 414 through 'n' 416 may variously include a datastore of entity identifiers, temporal events, or a combination thereof.

In certain embodiments, the security analytics system may be implemented to provide a risk management service 418. In certain embodiments, the risk management service 418 may be implemented to perform operations associated with accessing user profile information, as described in greater detail herein. In certain embodiments, the risk management service 418 may be implemented to provide the results of various analytics operations performed by the streaming 406 or on-demand 408 analytics modules. In certain embodiments, the risk management service 418 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
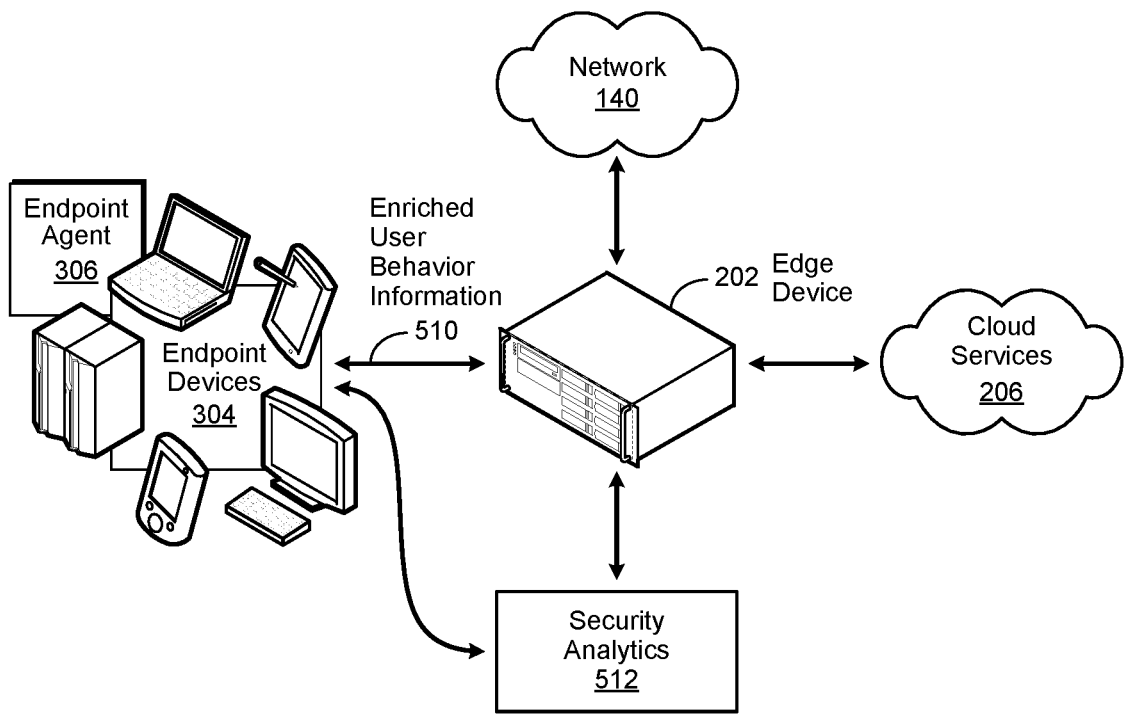
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 512 may be implemented to perform operations associated accessing user profile information. In certain embodiments, the security analytics system 512 may be implemented in combination with one or more endpoint agents 306, one or more edge devices 202, cloud services 206, a security analytics system 512, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 512 may be implemented as both a source and a sink of user behavior information. In certain embodiments, the security analytics system 512 may be implemented to serve requests for user/resource risk data. In certain embodiments, the edge device 202 and the endpoint agent 306, individually or in combination, may provide certain user behavior information to the security analytics system 512 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint device 304 is not implemented for a corresponding endpoint agent 306. However, the lack of such enriched user behavior information 510 may be accommodated in various embodiments, albeit with reduced functionality associated with operations associated accessing user profile information.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 512. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with managing the use of a blockchain to access a cyberprofile or other sensitive private information (SPI).

In certain embodiments, the security analytics system 512 may be implemented in different operational configurations. In certain embodiments, the security analytics system 512 may be implemented by using the endpoint agent 306. In certain embodiments, the security analytics system 512 may be implemented by using endpoint agent 306 in combination with the edge device 202. In certain embodiments, the cloud services 206 may likewise be implemented for use by the endpoint agent 306, the edge device 202, and the security analytics system 512, individually or in combination. In these embodiments, the security analytics system 512 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 512 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 512 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 512 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 512 may be coupled such that requests can be contextualized and fitted into a framework that evaluates their associated risk. It will be appreciated that such an embodiment works well with web-based data loss protection (DLP) approaches, as each transfer is no longer examined in isolation, but in the broader context of an identified user's actions, at a particular time, on the network 140.

As another example, the security analytics system 512 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 512 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 512 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
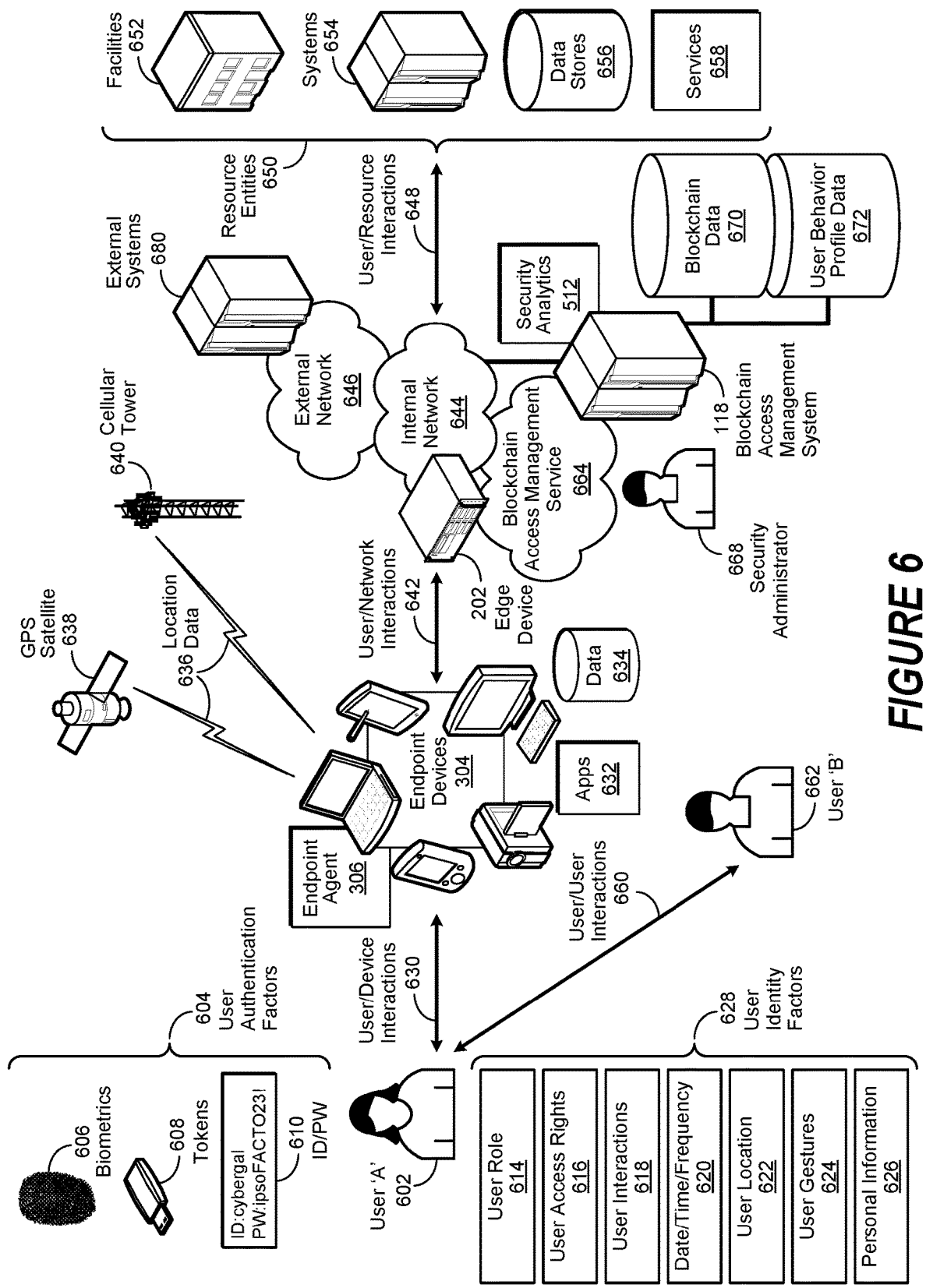
FIG. 6 is a simplified block diagram of the operation of a blockchain access management system.

FIG. 6 is a simplified block diagram of the operation of a blockchain access management system implemented in accordance with an embodiment of the invention. In certain embodiments, the blockchain access management system 118 may be implemented to manage blockchain access to user profile information and other sensitive personal information (SPI). In certain embodiments, the user profile information may be stored in the form of a user behavior profile.

As used herein, a user behavior profile broadly refers to a collection of information that uniquely distinguishes a user and their associated behavior, whether the behavior occurs within a physical realm or cyberspace. In certain embodiments, such information may include personal information associated with the user, but generated by an entity other than the user. Examples of such personal information may include government-issued identifiers, such as a Social Security Number (SSN), credit scores, financial transaction information, electronic medical records (EMRs), insurance claim information, and so forth.

In certain embodiments, a user behavior profile may be implemented as a multi-faceted user behavior profile. Examples of facets can include, a particular user authentication 604 or identity 628 factor. As an example, one facet of a multi-faceted user behavior profile may correspond to the use of a particular biometric 606 user authentication factor 604, while another facet may correspond to a user's access rights 616 to a certain system 654. In certain embodiments, a multi-faceted user behavior profile may be further implemented as a multi-dimensional user behavior profile, where each user authentication 604 or identity 628 factor associated with a facet may have a corresponding degree of dimensional detail.

As an example, a biometric 606 user authentication factor 604 associated with a retinal scan may simply have the dimension of "match" or "not match," which provides a low degree of dimensional detail. Conversely, its associated dimension information may include actual retinal pattern correlation scores, which provides a higher degree of dimensional detail. As yet another example, a user identity 628 factor associated with a user gesture 624, such as keyboard cadence, may simply indicate whether the user's keyboard usage is within an acceptable range of rhythm and speed metrics, which provides a low degree of dimensional detail. In contrast, its associated dimensional information may include key logger information related to which keys were struck, in which order, at which point in time, which provides a higher degree of dimensional detail.

As yet another example, a user identity 628 factor associated with date/time/frequency 620, such as when a particular file is accessed, may simply indicate which date the file was accessed, but not the exact time or how often. Alternatively, its associated dimensional information may include exact times the file was accessed, which by extension may indicated how frequently or infrequently the file was accessed during a particular temporal interval. In this example, the lack of the exact time or how often the file was accessed provides a low degree of dimensional detail. Conversely, its provision provides a high degree of dimensional detail, which may prove advantageous when assessing risk associated with the user accessing the file.

In various embodiments, a user behavior profile may be implemented as a multi-layered user behavior profile. In certain embodiments, each layer may correspond to a certain level of detail such as a particular user authentication 604 or identity 628 factor. In certain embodiments, the level of detail may correspond to a particular level of temporal detail corresponding to a particular user authentication, identification or behavior factor. As an example, one temporal detail layer of a multi-layered user behavior profile may correspond to a user identity factor 628 associated with user interactions 618, described in greater detail herein, over a 30-day period. In this example, the various user interactions 618 enacted during the 30-day period may be abstracted to simply represent which user/device 630, user/network 642, user/resource 648, and user/user 660 interactions took place, with their corresponding frequency. Alternatively, another temporal detail layer may provide the date/time/frequency 620 of each user interaction 618, not just during the 30-day period, but each 24 hour period therein. It will be appreciated that such a temporal level of detail related to such interactions may provide useful trend information, which in turn can be used advantageously when assessing security risk.

It will be appreciated that over time, the user behavior of a particular user, such as user 'A' 602, will be uniquely different and distinct from another user, such as user 'B' 662. Accordingly, user behavior profile '1' will uniquely reflect the user behavior of user '1', just as user behavior profile 'n' will uniquely reflect the user behavior of user 'n'. As an example, user 'A' 602 may have a user role 614 of sales administrator. Upon arriving at their office in the morning, the user consistently checks their email, item by item, responding to each in turn, followed by processing expense reports for field sales personnel. Then, after lunch, the user may access and review sales forecasts on an internal system 654. Furthermore, the user may exhibit sporadic keyboard entry interspersed with extensive mouse activity, or user gestures 624, when perusing the sales forecasts.

Moreover, personality type information associated with user 'A' 602 may indicate the user consistently exhibits a positive, outgoing attitude. In this example, the sequence of the activities enacted by user 'A' 602 throughout the day, and their frequency, correspond to the date/time/frequency 620 user identity factor 628. Likewise, the keyboard cadence and other user gestures 624 are examples of granular user identity factors 628, while the personality type information is an example of an abstract user identity 628 factor.

As another example, user 'B' 662 may have a user role of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 654. Additionally, the user may exhibit deliberate keyboard entry interspersed with mouse activity, or user gestures 624, when updating financial information. Moreover, personality type information associated with user 'B' 662 may indicate they consistently exhibit a reserved, introspective and contemplative attitude. As in the prior example, the sequence of the activities enacted by user 'B' 662 throughout the day, and their frequency, correspond to the date/time/frequency 620 user identity 628 factor. Likewise, as before, the keyboard cadence and other user gestures 624 are examples of granular user identity factors 628, while the personality type information is an example of an abstract user identity 628 factor.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 650 in the first month in the position, but by the sixth month, such access and interaction is commonplace and routine.

In certain embodiments, a user behavior profile associated with a particular user, such as user 'A' 602 or 'B' 662, is used by the blockchain access management system 118 to compare the user's current user behavior to past user behavior. If the user's current user behavior matches their past user behavior, then the blockchain access management system 118 may determine that the user's user behavior is acceptable. If not, then the blockchain access management system 118 may determine that the user's user behavior is anomalous or malicious. Accordingly, the blockchain access management system 118 may decide to perform reconfiguration operations to change the reference (such as an address or other type of unique identifier) of certain user profile information stored in the repository of user behavior profile data 672 to prevent it being accessed by a blockchain associated with the user.

In certain embodiments, the blockchain access management system 118 may be implemented to perform reconfiguration operations to encrypt the user profile information stored in the repository of user behavior profile data 672 to prevent it being accessed by a blockchain or a block within a blockchain associated with the user. As an example, the address of the user profile information stored in repository of user behavior profile data 672 may not have been changed, but its encryption prevents the blockchain or the block within the blockchain from using it. In certain embodiments, the blockchain access management system 118 may be implemented to perform reconfiguration operations to use a different encryption method to re-encrypt certain previously-encrypted user profile information stored in the repository of user behavior profile data 672 to prevent it being accessed by a blockchain associated with the user. As an example, the address of the user profile information stored in repository of user behavior profile data 672 may not have been changed, but its re-encryption prevents the blockchain from using previously stored cryptographic keys or other information it may contain from accessing it.

However, as described in greater detail herein, a change in a particular user's user behavior over time may be neither anomalous nor malicious. Instead, it may be acceptable behavior that simply evolves over time as a natural result of day-to-day user/device 630, user/network 642, user/resource 648, or user/user 660 interactions. In certain embodiments, the blockchain access management system 118 may be implemented to determine whether such changes in a user's user behavior over time are acceptable, anomalous, or malicious. In certain embodiments, a multi-faceted or multi-dimensional user behavior profile may likewise be implemented in combination with a multi-layer user behavior profile and the blockchain access management system 118 to make such determinations. In these embodiments, the method by which the multi-faceted, multi-dimensional, or multi-layered user behavior profile is implemented with the blockchain access management system 118 is a matter of design choice.

It will be appreciated that anomalous user behavior may include inadvertent or compromised user behavior. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous as the attempt as it is unusual for the user to attempt to access the proprietary data. However, the user behavior may manifest in context with consistent remote access patterns and provide sufficient evidence to determine the nature of activity.

Likewise, the blockchain access management system 118 may determine that the observed behavior to be malicious. As yet another example, an impostor may be attempting to pose as a legitimate user in an attempt to exploit one or more resources 650. In this example, the attempt to exploit one or more resources 650 is malicious user behavior. As yet still another example, a legitimate user may be attempting to increase their level of access to one or more resources 650. In this example, the user's attempt to increase their level of access may indicate malicious user behavior.

To further extend these examples, such resources may include various facilities 652, systems 654, data stores 656, or services 658. In various embodiments, the blockchain access management system 118 may be implemented to block a user if it is determined their user behavior is anomalous or malicious. In certain embodiments, the blockchain access management system 118 may be implemented modify a request submitted by a user if it is determined the request is anomalous or malicious. In various embodiments, the blockchain access management system 118 may be implemented to modify an outcome. For example, the blockchain access management system 118 may encrypt a file when a copy operation is detected.

In certain embodiments, the user behavior profile may be implemented as a cyberprofile. A cyberprofile, as likewise used herein, broadly refers to a collection of information that uniquely distinguishes an entity and their associated behavior within cyberspace. As likewise used herein, an entity broadly refers to something that exists as itself, whether physically or abstractly. In certain embodiments, an entity may be an individual user, a group, an organization, or a government. In certain embodiments, an entity may likewise be an item, a device, such as endpoint 304 and edge 202 devices, a network, such as an internal 644 and external 646 networks, a domain, an operation, or a process. In certain embodiments, an entity may be a resource 650, such as a geographical location or formation, a physical facility 652, a venue, a system 654, a data store 656, or a service 658, such as a service 658 operating in a cloud environment.

In certain embodiments, the blockchain access management system 118 may be implemented to process certain entity information associated with accessing user profile information via a blockchain. As likewise used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain entity identifier types or classifications.

In various embodiments, the blockchain access management system 118 may be implemented to use certain entity identifier information to ascertain the identity of an associated entity at a particular point in time. As used herein, entity identifier information broadly refers to an information element of an entity that can be used to ascertain or corroborate the identity of an associated entity at a particular point in time. In certain embodiments, the entity identifier information may include user authentication factors 604, user identity factors 628, location data 636, information associated with various endpoint 304 and edge 202 devices, internal 644 and external 646 networks, resource entities 650, or a combination thereof.

In certain embodiments, the user authentication factors 604 may include a user's biometrics 606, an associated security token 608, (e.g., a dongle containing cryptographic keys), or a user identifier/password (ID/PW) 610. In certain embodiments, the user authentication factors 604 may be used in combination to perform multi-factor authentication of a user, such as user 'A' 602 or 'B' 662. As used herein, multi-factor authentication broadly refers to approaches requiring two or more authentication factors. In general, multi-factor authentication includes three classes of user authentication factors 604. The first is something the user knows, such as a user ID/PW 610. The second is something the user possesses, such as a security token 608. The third is something that is inherent to the user, such as a biometric 606. In certain embodiments, user authentication operations may be performed by an associated authentication system. In certain embodiments, user authentication operations may continuously authenticate a user based on their user behaviors.

In certain embodiments, multi-factor authentication may be extended to include a fourth class of factors, which includes one or more user identity factors 628. In these embodiments, the fourth class of factors may include user behavior elements the user has done, is currently doing, or is expected to do in the future. In certain embodiments, multi-factor authentication may be performed on recurring basis. In various embodiments, the multi-factor authentication may be performed at certain time intervals during the enactment of a particular user behavior. In certain embodiments, the time interval may be uniform. In certain embodiments, the time interval may vary or be random. In certain embodiments, the multi-factor authentication may be performed according to the enactment of a particular user behavior, such as accessing a different resource 650. In various embodiments, certain combinations of the enhanced multi-factor authentication described herein may be used according to the enactment of a particular user behavior. From the foregoing, those of skill in the art will recognize that the addition of such a fourth class of factors not only strengthens current multi-factor authentication approaches, but further, allows the factors to be more uniquely associated with a given user.

In certain embodiments, the user identity factors 628 may include the user's role 614 (e.g., title, position, responsibilities, etc.), the user's access rights 616, the user's interactions 618, and the date/time/frequency 620 of those interactions 618. In certain embodiments, the user identity factors 628 may likewise include the user's location 622 when the interactions 618 are enacted, and the gestures 624 used to enact the interactions 618. In certain embodiments, the user gestures 624 may include key strokes on a keypad, a cursor movement, a mouse movement or click, a finger swipe, tap, or other hand gesture, an eye movement, or some combination thereof. In certain embodiments, the user gestures 624 may likewise include the cadence of the user's keystrokes, the motion, force and duration of a hand or finger gesture, the rapidity and direction of various eye movements, or some combination thereof. In certain embodiments, the user gestures 624 may include various audio or verbal commands performed by the user.

In certain embodiments, the user identity factors 628 may likewise include personality type information, technical skill level information, financial information, location information, peer information, social network information, or a combination thereof. The user identity factors 628 may likewise include various personal information 626, such as expense account information, paid time off (PTO) information, data analysis information, personally sensitive information (PSI), personally identifiable information (PII), or a combination thereof. Likewise, the user identity factors 628 may include insider information, misconfiguration information, third party information, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device 304, accessing a system 654, and entering a physical facility 652. Other examples of temporal events include uploading, transferring, downloading, modifying, or deleting data, such as data stored in a datastore 656, or accessing a service 658. Yet other examples of temporal events include interactions between two or more users 660, interactions between a user and a device 630, interactions between a user and a network 642, and interactions between a user and a resource 648, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the blockchain access management system 118 may be implemented to use information associated with such temporal resolution of an entity's identity to assess the risk associated with a particular entity, at a particular point in time, and adaptively respond with an associated response. In certain embodiments, the blockchain access management system 118 may be implemented to respond to such assessments in order to reduce operational overhead and improve system efficiency while maintaining security integrity. In certain embodiments, the response to such assessments may be performed by a security administrator 668. Accordingly, certain embodiments of the invention may be directed towards assessing the risk associated with the affirmative resolution of the identity of an entity at a particular point in time in combination with its associated contextual information. Consequently, the blockchain access management system 118 may be more oriented in various embodiments to risk adaptation than to security administration.

In certain embodiments, a cyberprofile may contain sensitive personal information 626 associated with a particular entity, such as a user. As used herein, sensitive personal information (SPI), also commonly referred to as personally identifiable information (PII), broadly refers to any information usable to ascertain the identity of a user, either by itself, or in combination with other information, such as contextual information described in greater detail herein. Examples of SPI may include the full or legal name of a user, initials or nicknames, place and date of birth, home and business addresses, personal and business telephone numbers, their gender, and other genetic information.

Another aspect of SPI is any information associated with a particular individual that is considered confidential. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

Other examples of SPI may include national identification numbers, such as a Social Security Number (SSN) or a passport number, vehicle registration plate and serial numbers, and driver's license numbers. Additional examples of SPI may include user identifiers and passwords 610, email addresses, social media identifiers, credit and debit card numbers, personal identification numbers (PINs), and other digital identity information. Yet other examples of SPI may include biometrics 606, user access rights 616, personality type information, various financial information, such as credit scores and financial transactions, personal correspondence, and other confidential information.

Skilled practitioners of the art will be aware of various government-mandated efforts to protect the privacy of SPI. One example of such a government-mandated effort is the General Data Protection Regulation (GPDR) for members of the European Union (EU). One aspect of the GPDR is various approaches to de-identifying SPI, including pseudonymization and anonymization. In the context of the GDPR, pseudonymization is defined as "the processing of personal data in such a manner that the personal data can no longer be attributed to a specific data subject (e.g., a user) without the use of additional information, provided that such additional information is kept separately and is subject to technical and organizational measures to ensure that the personal data are not attributed to an identified or identifiable natural person."

Various approaches to such de-identification includes removing or replacing direct identifiers (e.g., names, phone numbers, government-issued identifiers, etc.) within a dataset, but may leave in place data that may indirectly identify a person. These indirect identifiers are often referred to a quasi-identifiers or indirect identifiers. As used herein, anonymization broadly refers to the removal of any data within a data set that may directly, or indirectly, identify a user. In certain embodiments, the blockchain access management system 118 may be implemented to perform such pseudonymization or anonymization of user profile information. In certain embodiments, the pseudonymization or anonymization of user profile information may be accomplished by storing certain user profile information in a repository of user behavior profile data 672 at a particular address. In turn the address of the user profile information may be stored within a block of a blockchain, as described in greater detail herein. In certain embodiments, the block of the blockchain, as likewise described in greater detail herein, may be stored in a repository of blockchain data 670. In certain embodiments, access to the user profile information stored in the repository of user behavior profile data 672, or a portion thereof, may be disabled by changing its address.

Certain embodiments of the invention reflect an appreciation that a formerly-valid address stored in a blockchain block may become unusable if the actual address of the user profile information is changed. In certain embodiments, the address of the user profile information may be changed temporarily if a security breach is detected. Likewise, the original address of the user profile information may be restored in certain embodiments if it was determined that the privacy of the user profile information was not affected by the security breach. Certain embodiments of the invention reflect an appreciation that the user profile information is effectively "erased" when its address is changed.

In certain embodiments, the security of particular user profile information can be maintained by performing reconfiguration operations to change its address in the repository of user behavior profile data 672. Certain aspects of the invention likewise reflect an appreciation that a blockchain block may contain multiple addresses, each associated with a different set of user profile information. Accordingly, each set of user profile information can be individually secured, which in turn allows each to be temporarily "erased" by performing associated reconfiguration operations to change their respective address. Likewise, reconfiguration operations may be performed to permanently delete each set of user profile information if needed. Certain embodiments of the invention reflect an appreciation that the use of multiple addresses may provide granular management of user profile information. Certain embodiments of the invention likewise reflect an appreciation that performing reconfiguration operations to delete user profile information stored at a particular address effectively defeats the ability of a blockchain to access the user profile information regardless of how many blockchains may contain the address.

Those of skill in the art will likewise be aware that it is not uncommon for hackers, criminals and other actors to use various SPI to impersonate a user in order to gain unauthorized access to various systems, data, or facilities. It is likewise not uncommon for such individuals to masquerade as a user in order to collect their associated SPI for the purpose of identity theft. One known approach to gathering a user's SPI is to illicitly capture a data stream, such as a flow of network packets that include SPI sent by a user to another machine, such as a particular external system 680. Defenses against such approaches include encrypting the data stream prior to being communicated across a network, such as the internal 644 or external 646 networks shown in FIG. 6.

However, other approaches, such as the use of a key logger, may surreptitiously capture the user's keystrokes or user gestures 624 and communicate the resulting data stream in their native form to a hacker or other infiltrator. Another issue is the possibility that a normally-trusted insider, such as a security administrator 668, may have access to a decrypted data stream as part of their day-to-day responsibilities. As an example, a security administrator 668 may be using a security analytics 512 system to perform a threat analysis related to a particular user. In the process, they may be exposed to various SPI associated with the user, such as certain user IDs and passwords 610. It will be appreciated that such exposure creates the opportunity for a security breach, whether intended or not. Another approach is to impersonate a legitimate website. In such approaches, the user may navigate to the site and innocently enter their passwords, only to have them captured for later use in illegal activities.

In certain embodiments, the blockchain access management system 118 may be implemented to use information associated with certain user behavior elements to manage blockchain access to user profile information. A user behavior element, as used herein, broadly refers to a discrete element of a user's behavior during the performance of a particular operation in a physical realm, cyberspace, or a combination thereof. In certain embodiments, such user behavior elements may be associated with a user/device 630, a user/network 642, a user/resource 648, a user/user 660 interaction, or combination thereof.

As an example, user 'A' 602 may use an endpoint device 304 to browse a particular web page on a news site on the Internet. In this example, the individual actions performed by user 'A' 602 to access the web page are user behavior elements that constitute a user behavior. As another example, user 'A' 602 may use an endpoint device 304 to download a data file from a particular system 654. In this example, the individual actions performed by user 'A' 602 to download the data file, including the use of one or more user authentication factors 604 for user authentication, are user behavior elements that constitute a user behavior. In certain embodiments, the user/device 630 interactions may include an interaction between a user, such as user 'A' 602 or 'B' 662, and an endpoint device 304.

In certain embodiments, the user/device 630 interaction may include interaction with an endpoint device 304 that is not connected to a network at the time the interaction occurs. As an example, user 'A' 602 or 'B' 662 may interact with an endpoint device 304 that is offline, using applications 632, accessing data 634, or a combination thereof, it may contain. Those user/device 630 interactions, or their result, may be stored on the endpoint device 304 and then be accessed or retrieved at a later time once the endpoint device 304 is connected to the internal 644 or external 646 networks.

In certain embodiments, the endpoint device 304 may be used to communicate data through the use of an internal network 644, an external network 646, or a combination thereof. In certain embodiments, the internal 644 and the external 646 networks may include a public network, such as the Internet, a physical private network, a virtual private network (VPN), or any combination thereof. In certain embodiments, the internal 644 and external 646 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/resource 648 interactions may include interactions with various resources 650. In certain embodiments, the resources 650 may include various facilities 652 and systems 654, either of which may be physical or virtual, as well as data stores 656 and services 658. In certain embodiments, the user/user 660 interactions may include interactions between two or more users, such as user 'A' 602 and 'B' 662. In certain embodiments, the user/user interactions 660 may be physical, such as a face-to-face meeting, via a user/device 630 interaction, a user/network 642 interaction, a user/resource 648 interaction, or some combination thereof.

In certain embodiments, the user/user 660 interaction may include a face-to-face verbal exchange between two users. In certain embodiments, the user/user 660 interaction may include a written exchange, such as text written on a sheet of paper, between two users. In certain embodiments, the user/user 660 interaction may include a face-to-face exchange of gestures, such as a sign language exchange, between two users. In certain embodiments, temporal event information associated with various interactions 630, 642, 648, 660 may be collected and used to manage blockchain access to user profile information.

In certain embodiments, the blockchain access management system 118 may be implemented to observe user behavior at one or more points of observation within a cyberspace environment. In certain embodiments, the points of observation may occur during various user interactions, such as user/device 630, user/network 642, user/resource 648, and user/user 660 interactions described in greater detail herein. As an example, a user/user 660 interaction may include an interaction between user 'A' 602 and '13' 662.

In certain embodiments, the point of observation may include cyber behavior of various kinds within an internal 644 network. As an example, the cyber behavior within an internal 644 network may include a user accessing a particular internal system 654 or data store 656. In certain embodiments, the point of observation may include cyber behavior of various kinds within an external 646 network. As an example, the cyber behavior within an external 646 network may include a user's social media activities or participation in certain user forums. Those of skill in the art will recognize that many such examples of user/device 630, user/network 642, user/resource 648, and user/user 660 interactions are possible. Accordingly, the foregoing is not intended to limit the spirit, scope or intent of the invention.

In certain embodiments, the blockchain access management system 118 may be implemented to process certain contextual information, to ascertain the identity of an entity at a particular point in time. In certain embodiments, the contextual information may include location data 636. In certain embodiments, the endpoint device 304 may be configured to receive such location data 636, which is used as a data source for determining the user's location 622.

In certain embodiments, the location data 636 may include Global Positioning System (GPS) data provided by a GPS satellite 638. In certain embodiments, the location data 636 may include location data 636 provided by a wireless network, such as from a cellular network tower 640. In certain embodiments (not shown), the location data 636 may include various Internet Protocol (IP) or other network address information assigned to the endpoint 304 or edge 202 device. In certain embodiments (also not shown), the location data 636 may include recognizable structures or physical addresses within a digital image or video recording.

In certain embodiments, the endpoint devices 304 may include an input device (not shown), such as a keypad, magnetic card reader, token interface, biometric sensor, digital camera, video surveillance camera, and so forth. In certain embodiments, such endpoint devices 304 may be directly, or indirectly, connected to a particular facility 652 or system 654. As an example, the endpoint device 304 may be directly connected to an ingress/egress system, such as an electronic lock on a door or an access gate of a parking garage. As another example, the endpoint device 304 may be indirectly connected to a physical security mechanism through a dedicated security network.

In certain embodiments, the blockchain access management system 118 may be implemented as a stand-alone system. In certain embodiments, the blockchain access management system 118 may be implemented as a distributed system. In certain embodiment, the blockchain access management system 118 may be implemented as a virtual system, such as an instantiation of one or more virtual machines (VMs). In certain embodiments, the blockchain access management system 118 may be implemented as a blockchain access management service 664. In certain embodiments, the blockchain access management service 664 may be implemented in a cloud environment familiar to those of skill in the art. Those of skill in the art will recognize that many such embodiments are possible. Accordingly, the foregoing is not intended to limit the spirit, scope or intent of the invention.

In certain embodiments, transportable cyberprofile management operations are initiated by ongoing operations being performed to monitor cyber behavior for abnormal events, such as a data breach or a cyberprofile being compromised. If an abnormal event is detected, then threat analysis operations are performed to determine whether the abnormal event represents a threat to a particular cyberprofile. If so, then cyberprofile elements associated with the affected cyberprofile are identified in a repository of user behavior profile data 672.

Once identified, addresses referencing the storage location of the associated cyberprofile elements stored in a repository of user behavior profile data 672 are changed, followed by information related to the abnormal event, and the changed address of the cyberprofile elements, being logged. In certain embodiments, the changing of the address of the cyberprofile elements, and the logging of the information related to the abnormal event, may be performed by the blockchain access management system 118.

The cyberprofile is then processed to reflect that the address of its associated cyberprofile elements has been changed. Associated threat remediation operations are then performed. In certain embodiments, the threat remediation operations may be performed by a security administrator 668. In these embodiments, the selection of the remediation operations to be performed, and the method by which they are performed, is a matter of design choice.

Figure 7:
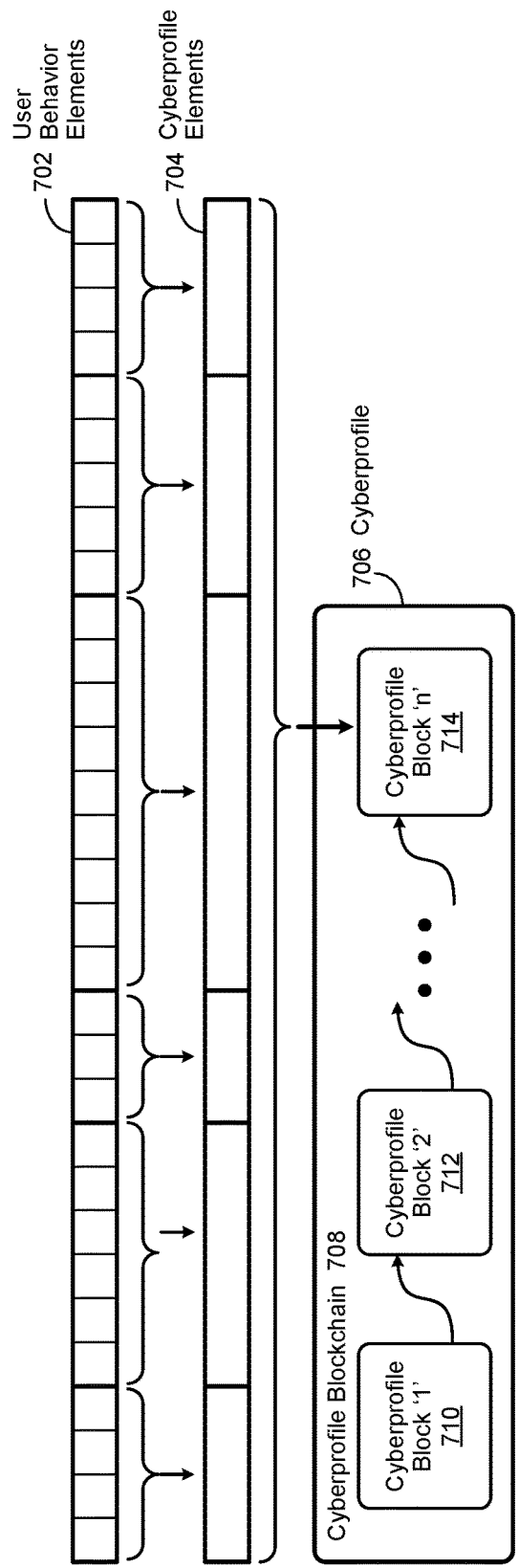
FIG. 7 is a simplified block diagram of a cyberprofile implemented as a blockchain.

FIG. 7 is a simplified block diagram of a cyberprofile implemented in accordance with an embodiment of the invention as a blockchain. As used herein, a blockchain broadly refers to a data structure that is tamper-evident and appendable. In certain embodiments, a blockchain may further refer to a decentralized, distributed data structure whose contents are replicated across a number of systems. These contents are stored in a chain of fixed structures commonly referred to as "blocks," such as cyberprofile blocks '1' 710, '2' 712, and so forth, through 'n' 714. Each of these blocks typically contains certain information about itself, such as a unique identifier, a reference to its previous block, and a hash value generated from the data it contains. As an example, cyberprofile block '2' 712 would contain a reference to cyberprofile block '1 710, yet their respective hashes values would be different as they contain different data.

Those of skill in the art will be aware that blockchains may be implemented in different ways and for different purposes. However, these different implementations typically have certain common characteristics. For example, in certain instantiations, blockchains are generally distributed across various systems, each of which maintains a copy of the blockchain. Updates to one copy of the blockchain, such as the addition of a cyberprofile block 'n' 714, results in corresponding updates to the other copies. Accordingly, the contents of the blockchain, including its most recent updates, are available to all participating users of the blockchain, who in turn use their own systems to authenticate and verify each new block. This process of authentication and verification ensures that the same transaction does not occur more than once. Furthermore, with distributed types of block chains, the legitimacy of a given block, and its associated contents, is only certified once a majority of participants agree to its validity.

In general, the distributed and replicated nature of a blockchain, such as a cyberprofile blockchain 708, makes it difficult to modify historical records without invalidating any subsequent blocks added thereafter. Consequently, the user behavior data within a given cyberprofile blockchain 708 is essentially immutable and tamper-evident. However, this immutability and tamper-evidence does not necessarily ensure that the user behavior data recorded in the cyberprofile blockchain 708 can be accepted as an incontrovertible truth. Instead, it simply means that what was originally recorded was agreed upon by a majority of the cyberprofile blockchain's 708 participants.

Certain embodiments of the invention reflect an appreciation that every transaction in a blockchain is serialized (i.e., stored in a sequence). Additionally, in certain embodiments, every transaction in a blockchain is time-stamped, which is useful for tracking interactions between participants and verifying various information contained in, or related to, a particular blockchain. Furthermore, instructions may be embedded within individual blocks of a blockchain. These instructions, in the form of computer-executable code, allow transactions or other operations to be initiated if certain conditions are met.

Certain embodiments of the invention likewise reflect an appreciation that while blockchains are typically implemented as a decentralized, distributed data structure whose contents are replicated across a number of systems, they may also be implemented in other ways. Accordingly, the cyberprofile blockchain 708 may be implemented in certain embodiments to be stored as a single instance on a system, whether physical or virtual, at a single address. In certain embodiments, individual cyberprofile blocks '1' 710, '2' 712 through 'n' 714 may be centrally stored at different addresses on the same system. In certain embodiments, a single instance of cyberprofile blocks '1' 710, '2' 712, through 'n' 714 may be stored individually on two or more systems, each with a corresponding, unique address.

In certain embodiments, individual cyberprofile blockchains 708 associated with a given cyberprofile 706 may be stored at a single address on a system. In certain embodiments, individual cyberprofile blockchains 708 associated with a given cyberprofile 706 may be stored individually on two or more systems, each with a corresponding, unique address. In certain embodiments, individual cyberprofile blockchains 708 associated with a given cyberprofile 706 may be stored on two or more systems, each with a corresponding, unique address. Those of skill in the art will recognize that many such embodiments are possible. Accordingly, the foregoing is not intended to limit the spirit, scope or intent of the invention.

Referring now to FIG. 7, groups of user behavior elements 702, described in greater detail herein, may be combined in various embodiments to generate one or more associated cyberprofile elements 704, likewise described in greater detail herein. In certain embodiments, the resulting cyberprofile elements 704 may in turn be combined to generate a cyberprofile block, such as cyberprofile block 'n' 714. As used herein, a cyberprofile block broadly refers to a blockchain block implemented to contain various cyberprofile information. As likewise used herein, cyberprofile information broadly refers to any entity information, entity identifier information, behavior element information, temporal information, contextual information, or combination thereof, associated with a cyberprofile, as described in greater detail herein. The resulting cyberprofile block is then appended to a target cyberprofile blockchain 708. In certain embodiments, the cyberprofile blockchain 708, or a portion thereof, may be implemented as a cyberprofile 706. In certain embodiments, the cyberprofile 706 may be implemented to contain cyberprofile information not contained in the cyberprofile blockchain 708.

In certain embodiments, the cyberprofile blockchain 708 may be implemented to be associated with an individual entity. In these embodiments, user behavior blocks '1' 710 and '2' 712 through 'n' 714 are associated with the individual entity. In certain embodiments, the cyberprofile blockchain 708 may be implemented to be associated with two or more entities. In these embodiments, individual user behavior blocks '1' 710 and '2' 712 through 'n' 714 may be respectively associated with two or more cyberprofiles 806, which in turn are respectively associated with a particular entity. In certain embodiments, the cyberprofile blockchain 708 may be parsed to identify which of the cyberprofile blocks '1' 710 and '2' 712 through 'n' 714 are associated with a given cyberprofile 706, which in turn is respectively associated with a particular entity.

In certain embodiments, data associated with a given cyberprofile blockchain 808 may be used in the performance of user behavior monitoring operations to detect acceptable, anomalous, malicious and unknown behavior enacted by a user. In certain embodiments, the performance of these user behavior monitoring operations may involve comparing a newly-generated cyberprofile block, such as cyberprofile block 'n' 714 to previously-generated user behavior blocks, such as cyberprofile blocks '1' 710 and '2' 712.

In certain embodiments, if the contents of the cyberprofile block 'n' 714 are substantively similar to the contents of cyberprofile blocks '1' 710 and '2' 712, then the behavior of the user may be judged to be acceptable. However, if the contents of the cyberprofile block 'n' 714 are substantively dissimilar to the contents of cyberprofile blocks '1' 710 and '2' 712, then the behavior of the user may be judged to be anomalous, malicious or unknown. In these embodiments, the method by which the contents of cyberprofile block 'n' 714 are determined to be substantively similar, or dissimilar, to the contents of cyberprofile blocks '1' 710 and '2' 712 is a matter of design choice.

Figure 8:
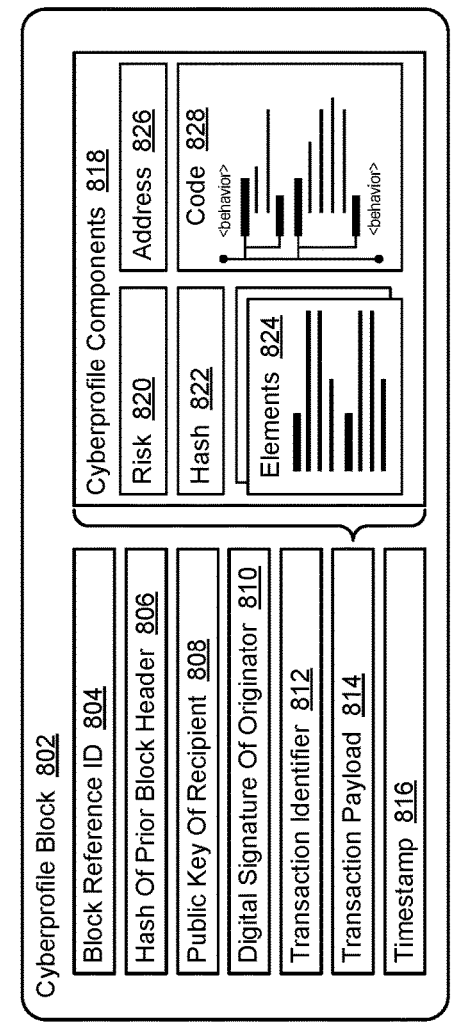
FIG. 8 is a simplified block diagram of a cyberprofile block in a blockchain.

FIG. 8 is a simplified block diagram of a cyberprofile block in a blockchain implemented in accordance with an embodiment of the invention. In certain embodiments, a cyberprofile blockchain 708, as shown in FIG. 7, may contain one or more user cyberprofile blocks 802, such as cyberprofile blocks '1' 710, '2' 712, through 'n' 714, likewise shown in FIG. 7. In these embodiments, each cyberprofile block 802 may include either data, metadata or both, such as a block reference identifier (ID) 804, a hash value of the prior cyberprofile block's header 806 information, the public key of the recipient 808 of the cyberprofile blockchain transaction, and the digital signature of the originator 810 of the cyberprofile blockchain transaction. The cyberprofile block 802 may likewise include additional, data, metadata, or both, such as a cyberprofile blockchain transaction identifier 812, a transaction payload 814, and a transaction timestamp 816.

In certain embodiments, the transaction payload 814 may include one or more cyberprofile components 818. In certain embodiments, the cyberprofile components 818 may include various cyberprofile elements 824, described in greater detail herein, and a hash 822 value of the cyberprofile elements 824. In certain embodiments, the cyberprofile elements 824 may likewise include associated user behavior elements, in their entirety or a portion thereof. In certain embodiments, the cyberprofile element hash 822 value is implemented to determine whether the integrity of the cyberprofile elements 824 has been compromised.

In certain embodiments, the cyberprofile components 818 may not include the cyberprofile elements 824. Instead, the cyberprofile elements 824 may be stored in a different location, such as a remote system. In certain embodiments, the remote system may include a repository of user behavior profile data, within which the cyberprofile elements are stored. In certain embodiments, the cyberprofile elements 824 may be stored in the form of one or more cyberprofile blocks 802 at the different location. In certain embodiments, the one or more cyberprofile blocks 802 may be stored in the form of a cyberprofile blockchain at the different location.

In certain embodiments, the location of the cyberprofile elements 824 may be referenced by an address 826. In certain embodiments, the address 826 may be a network address, such as an Internet Protocol (IP) address. In certain embodiments, the address 826 may be a Uniform Resource Locator (URL) address. In certain embodiments, the cyberprofile elements 824 may be contained in the cyberprofile components 818 as well as stored in a different location at a particular address. In certain embodiments, the cyberprofile element hash 822 value may include the computed hash of the cyberprofile elements 824 and the address of the location where they are stored.

In certain embodiments, the cyberprofile components 818 may include executable code 828. In certain embodiments, the executable code 828 may be implemented to access the cyberprofile elements 824 stored in a different location. In certain embodiments, the executable code 828 may be implemented to access a cyberprofile blockchain associated with the cyberprofile elements 824, regardless of where they may be stored. In certain embodiments, the executable code 828 may be used by a blockchain management access system, described in greater detail herein, to detect acceptable, anomalous, malicious and unknown behavior being enacted by a user. In certain embodiments, user behavior data contained in one or more cyberprofile elements 824 may be used in combination with the executable code 828 to perform user behavior monitoring operations, likewise described in greater detail herein.

In certain embodiments, the executable code 828 may include state information such as pre-calculated information associated with one or more cyberprofile elements 824. In certain embodiments, the executable code 824 may include a model of good behavior which is used when detecting acceptable, anomalous, malicious and unknown behavior being enacted by a user. In certain embodiments, the model may include a series of rules of behaviors that might lead to a determination regarding trustworthiness. In certain embodiments, the series of rules may include communication related rules, data movement related rules and/or programming modification type rules. In certain embodiments, such a model may enable the blockchain access management system to assess an intent of a user.

In certain embodiments, the cyberprofile components 818 may also contain a risk 820 score. In certain embodiments, the risk 820 score may be used by a blockchain access management system to assess the state (e.g., the risk or trustworthiness) of a particular user while enacting a given user behavior. In certain embodiments, the state may also be stored within the cyberprofile block 802. In certain embodiments, the state is assessed at a specific time and has a timestamp or other temporal information associated with the state. In one embodiment, the user risk 820 score might be associated with a particular user behavior element, such as accessing sensitive human resource documents. In one embodiment, the risk 820 score might be related to a user's overall user behavior. In various embodiments, the cyberprofile block 802 may also contain information regarding how the risk 820 score was generated, such as the model that was used. Certain embodiments of the invention reflect an appreciation that the storing of this information assists in providing a historical view of how the risk 820 score was generated when it was generated. Certain embodiments of the invention likewise reflect an appreciation that this information can be useful in identifying what type of user behavior led to the risk 820 score (e.g., what was the anomaly).

As an example, a user may have a low risk 820 score for general cyberspace activity, but a high risk 820 score for accessing an organization's financial data. To continue the example, the user's role in the organization may be related to maintaining a physical facility. In that role, the user may requisition cleaning supplies and schedule other users to perform maintenance. Accordingly, attempting to access the organization's financial data, particularly over a weekend, would indicate anomalous, or possibly malicious, behavior. To continue the example, such an attempt may result in a high risk 820 score being assigned to that particular user behavior element. In certain embodiments, the risk 820 score may change as a result of information obtained from a third party and not just from observable behavior. For example, a user's credit score changes, or the user performs a wire transfer to a known suspicious location, then the risk 820 score may adjusted accordingly.

In certain embodiments, the executable code 828 may be implemented to submit a request to the blockchain access management system to change the address 826 where the cyberprofile elements 824 may be stored. As an example, a user's cyberprofile may have become compromised. In this example, the blockchain access management system may likewise change the address of where the cyberprofile elements 824 are stored to prevent unauthorized access by the compromised cyberprofile. Those of skill in the art will recognize that many such embodiments and examples are possible. Accordingly, the foregoing is not intended to limit the spirit, scope or intent of the invention.

Figure 9:
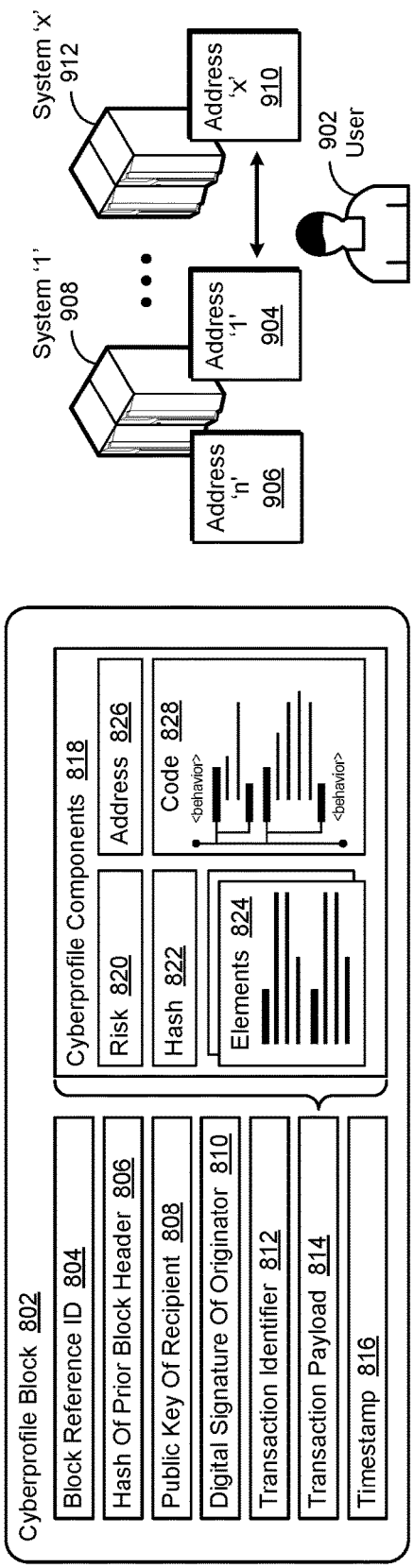
FIG. 9 is a simplified block diagram of a transportable cyberprofile.

FIG. 9 is a simplified block diagram of a transportable cyberprofile implemented in accordance with an embodiment of the invention. As used herein, a transportable cyberprofile broadly refers to a cyberprofile implemented as a cyberprofile blockchain, or portion thereof, that is in turn implemented such that the addresses respectively associated with its corresponding cyberprofile blocks, or their associated cyberprofile elements, can be reassigned. As an example, a cyberprofile block, such as the cyberprofile block 802 shown in FIG. 8, may have been implemented such that its associated cyberprofile elements 824 have been stored at a different location, referenced by an address 826.

In this example, the integrity of the cyberprofile associated with the cyberprofile block 802 may have been compromised. Accordingly, a blockchain access management system may be implemented to change the storage location of the cyberprofile block 802, or its associated cyberprofile elements 824, to an address that is different than the address 826 stored in the cyberprofile components 818. Consequently the new storage location of the cyberprofile block 802, or its associated cyberprofile elements 824, is no longer referenced by the address 826 stored in the cyberprofile components 818. From the foregoing, it will be appreciated that changing the address of the cyberprofile block 802, or its associated cyberprofile elements 824, will likely limit the degree to which the associated cyberprofile may be compromised.

In certain embodiments, a transportable cyberprofile associated with a particular user 902 may have one or more associated cyberprofile blockchains, or portions thereof, stored at address '1' 904 on system '1' 906. In certain embodiments, address '1' 904 may be referenced as an address contained within a corresponding cyberprofile block, such as the address 826 in the cyberprofile block 802 shown in FIG. 8. In certain embodiments, as described in greater detail herein, one or more cyberprofile blockchains, or portions thereof, may be associated with a particular transportable cyberprofile.

In certain embodiments, the one or more cyberprofile blockchains, or portions thereof, may be stored at address '1' 904 on system '1' 906. In certain embodiments, as likewise described in greater detail herein, the one or more cyberprofile blockchains, or portions thereof, stored at address '1' 904 on system '1' 906 may be assigned a new address 'n' 906 on system '1' 908. In certain embodiments, the one or more associated cyberprofile blockchains, or portions thereof, stored at address '1' 904 on system '1' 906 may be assigned a new address 'x' 910 on system 'x' 912.

In certain embodiments, the one or more associated cyberprofile blockchains, or portions thereof, stored at address '1' 904 on system '1' 906 may individually be assigned a new address 'n' 908 on system '1' 908 or a new address 'x' 910 on system 'x' 912. In these embodiments, the method by which the individual cyberprofile blockchains, or portions thereof, are selected to be assigned a new address 'n' 906 on system '1' 908, or a new address 'x' 910 on system 'x' 912, is a matter of design choice. Skilled practitioners of the art will recognize that many such embodiments are possible. Accordingly, the foregoing is not intended to limit the spirit, scope or intent of the invention.

Figure 10:
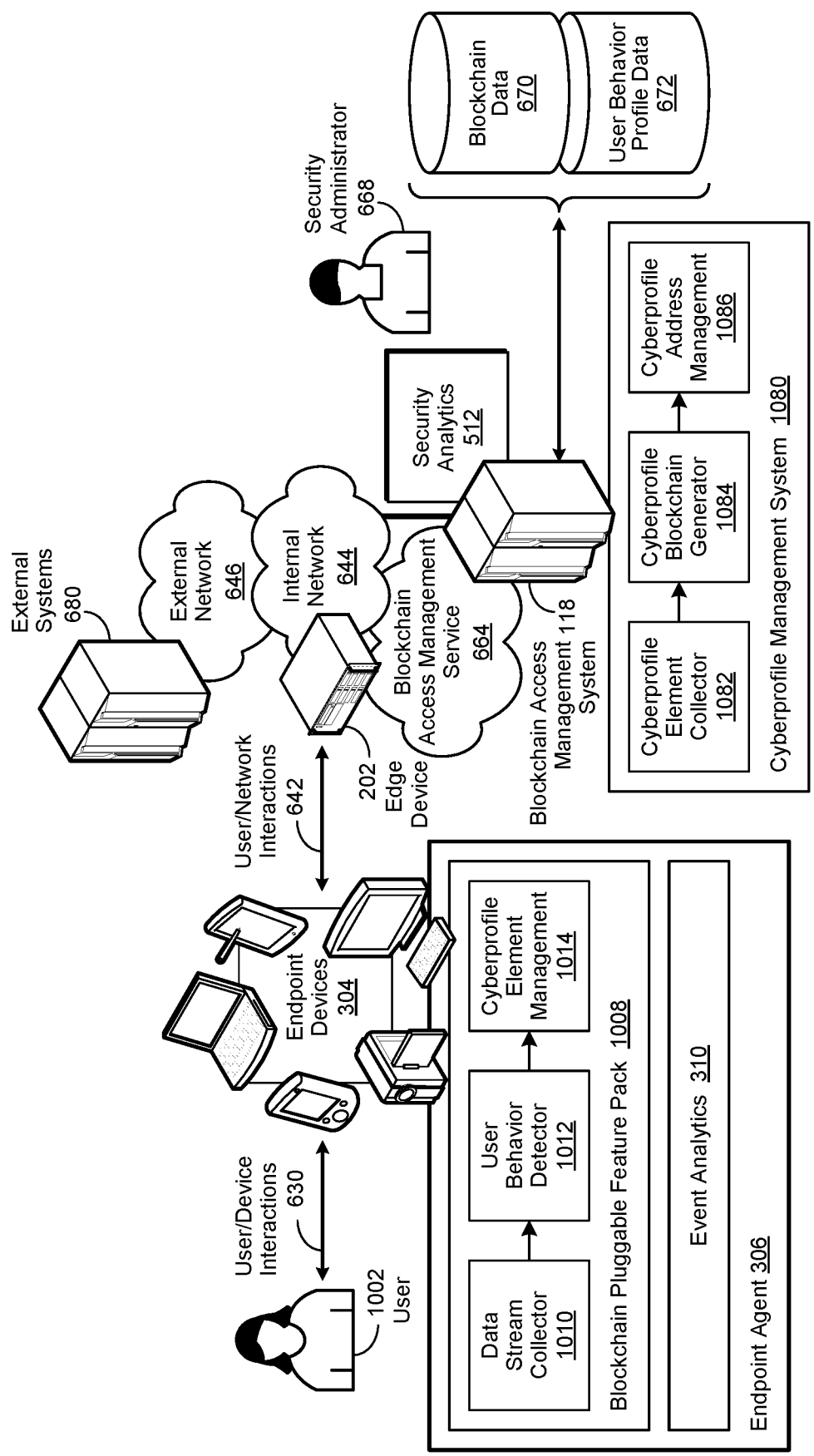
FIG. 10 is a simplified block diagram of the operation of a blockchain access management system used for managing access to a transportable cyberprofile.

FIG. 10 is a simplified block diagram of the operation of a blockchain access management system implemented in accordance with an embodiment of the invention for managing access to a transportable cyberprofile. In various embodiments, a blockchain access management system 118 may be implemented to manage blockchain access to cyberprofile information. In certain embodiments, user behavior associated with a user 1102 may be monitored.

In certain embodiments, the user behavior may be monitored during user/device interactions 630 between the user 1002 and an endpoint device 304. In certain embodiments, as described in greater detail herein, an endpoint agent 306 may be implemented on the endpoint device 304 to perform the user behavior monitoring. In certain embodiments, a cyberprofile management system 1080 may be implemented in combination with a blockchain access management system 118 to perform the user behavior monitoring, or to manage blockchain access to cyberprofile information, or a combination thereof.

In certain embodiments, the endpoint agent 306 may be implemented to include an event analytics 310 module and a blockchain pluggable feature pack 1008. In certain embodiments, the blockchain pluggable feature pack 1008 may be further implemented to include a data stream collector 1010 module, a user behavior element detector 1012 module, and a cyberprofile element management 1014 module. In certain embodiments, the data stream collector 1010 module may be implemented to capture data streams resulting from user/device interactions 630 between a user 1002 and a corresponding endpoint device 304. In certain embodiments, the data stream collector 1010 module may be implemented to capture data streams resulting to user/network interactions 642 between an endpoint device 304 and an edge device 202. In certain embodiments, certain user/network interactions 642 may be associated with certain user/device interactions 630.

In certain embodiments, the user behavior detector 1012 module may be implemented to identify various user behavior elements in the resulting data streams, which may then be provided to the cyberprofile element management 1014 module. In certain embodiments, the cyberprofile element management 1014 module may be implemented to process the resulting user behavior elements into cyberprofile elements, described in greater detail herein. In turn, the cyberprofile element management 1014 module may be implemented in certain embodiments to provide the resulting cyberprofile elements to the blockchain access management service 118.

In certain embodiments, the cyberprofile elements received by the blockchain access management service 118 may be provided to the cyberprofile management system 1080 for processing. In certain embodiments, the cyberprofile management system 1080 may be implemented to include a cyberprofile element collector 1082 module, a cyberprofile blockchain generator 1084 module, and a cyberprofile address management 1086 module. In certain embodiments, the cyberprofile elements provided by the blockchain access management system 118 may be received by the cyberprofile element collector 1082 and then provided to the cyberprofile blockchain generator 1084 module.

In certain embodiments, the cyberprofile blockchain generator 1084 module may be implemented to process the cyberprofile elements, and other associated information, to generate cyberprofile blocks, described in greater detail herein. In certain embodiments, the cyberprofile blockchain generator 1184 module may be implemented to process the resulting cyberprofile blocks to generate a corresponding cyberprofile blockchain, likewise described in greater detail herein. In certain embodiments, the cyberprofile blockchain generator 1084 may likewise be implemented to process the cyberprofile blockchain to associate it with a particular cyberprofile. In certain embodiments, the cyberprofile may likewise be associated with other cyberprofile blockchains, other associated information, or a combination thereof.

In certain embodiments, the cyberprofile blockchain generator 1084 may be implemented to provide a particular cyberprofile block generated by the cyberprofile blockchain generator 1084 module to the cyberprofile address management 1086 module for additional processing. In certain embodiments, the cyberprofile address management 1086 module may be implemented to process the cyberprofile block to extract its associated cyberprofile elements and store them at a particular address in a repository of user behavior profile data 672. In certain embodiments, the cyberprofile address management 1086 module may be implemented to further process the cyberprofile block to insert the address corresponding to the location of the cyberprofile elements as a cyberprofile component, as described in the text associated with FIG. 8.

In certain embodiments, the blockchain access management system 118 may be implemented to use cryptographic approaches known to those of skill in the art to encrypt cyberprofile elements stored at their respective addresses in the repository of user behavior profile data 672. In certain embodiments, the blockchain access management system 118 may be implemented to receive information that various cyberprofile information associated with a particular user 1002 may be compromised or have the potential of being compromised. Accordingly, the blockchain access management system 118 may be implemented in certain embodiments to submit a request to the cyberprofile management system 1080 to change the respective address '1' 672 through 'n' 674 of certain cyberprofile elements that may be associated with the compromised cyberprofile information. In certain embodiments, the compromised cyberprofile information may include a particular cyberprofile element, a cyberprofile blockchain, or a cyberprofile in its entirety.

Figure 11:
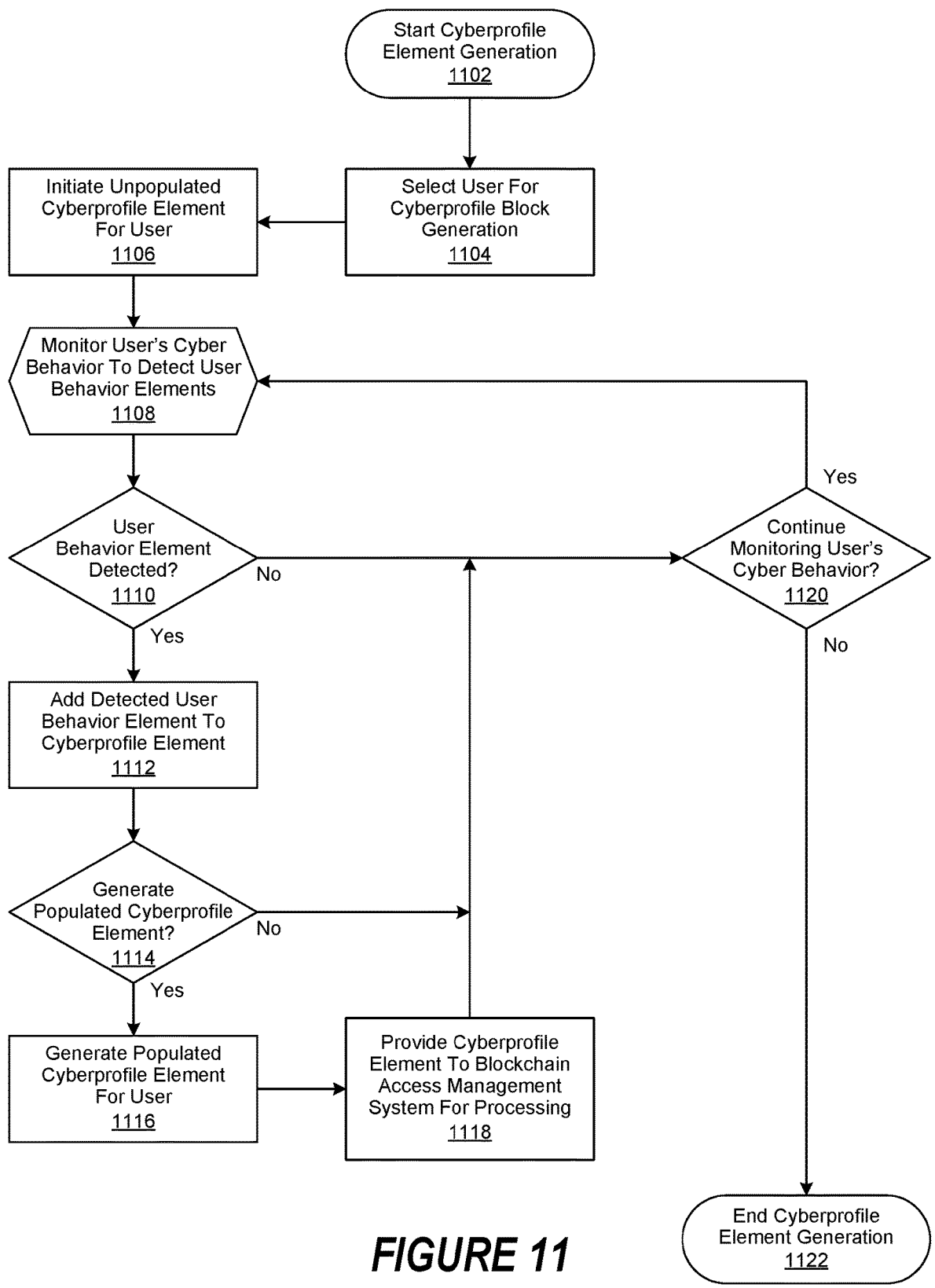
FIG. 11 is a generalized flowchart of the performance of cyberprofile element generation operations.

FIG. 11 is a generalized flowchart of cyberprofile element generation operations performed in accordance with an embodiment of the invention. In this embodiment, cyberprofile element generation operations are begun in step 1102, followed by the selection of a user in step 1104 for associated cyberprofile block generation. An unpopulated cyberprofile element for the selected user is then initiated in step 1106, followed by the performance of ongoing monitoring operations being performed in step 1108 to detect user behavior elements associated with the selected user's cyber behavior.

A determination is then made in step 1110 whether a user behavior element has been detected. If not, then a determination is made in step 1120 whether to continue monitoring the user's cyber behavior to detect associated behavior elements. If so, then the process is continued, proceeding with step 1108. Otherwise, cyberprofile element generation operations are ended in step 1122. However, if it was determined in step 1110 that a user behavior element was detected, then the detected user behavior element is added to the previously-generated cyberprofile element in step 1112.

A determination is then made in step 1114 whether to generate a populated cyberprofile element from any associated user behavior elements. If not, then the process is continued, proceeding with step 1120. Otherwise, a populated cyberprofile element is generated from its associated user behavior elements in step 1116. The resulting populated cyberprofile element is then provided in step 1118 to a blockchain access management system for further processing, as described in greater detail herein. Thereafter, of if it was determined in step 1114 to not generate a populated cyberprofile element, the process is continued, proceeding with step 1120.

Figure 12A:
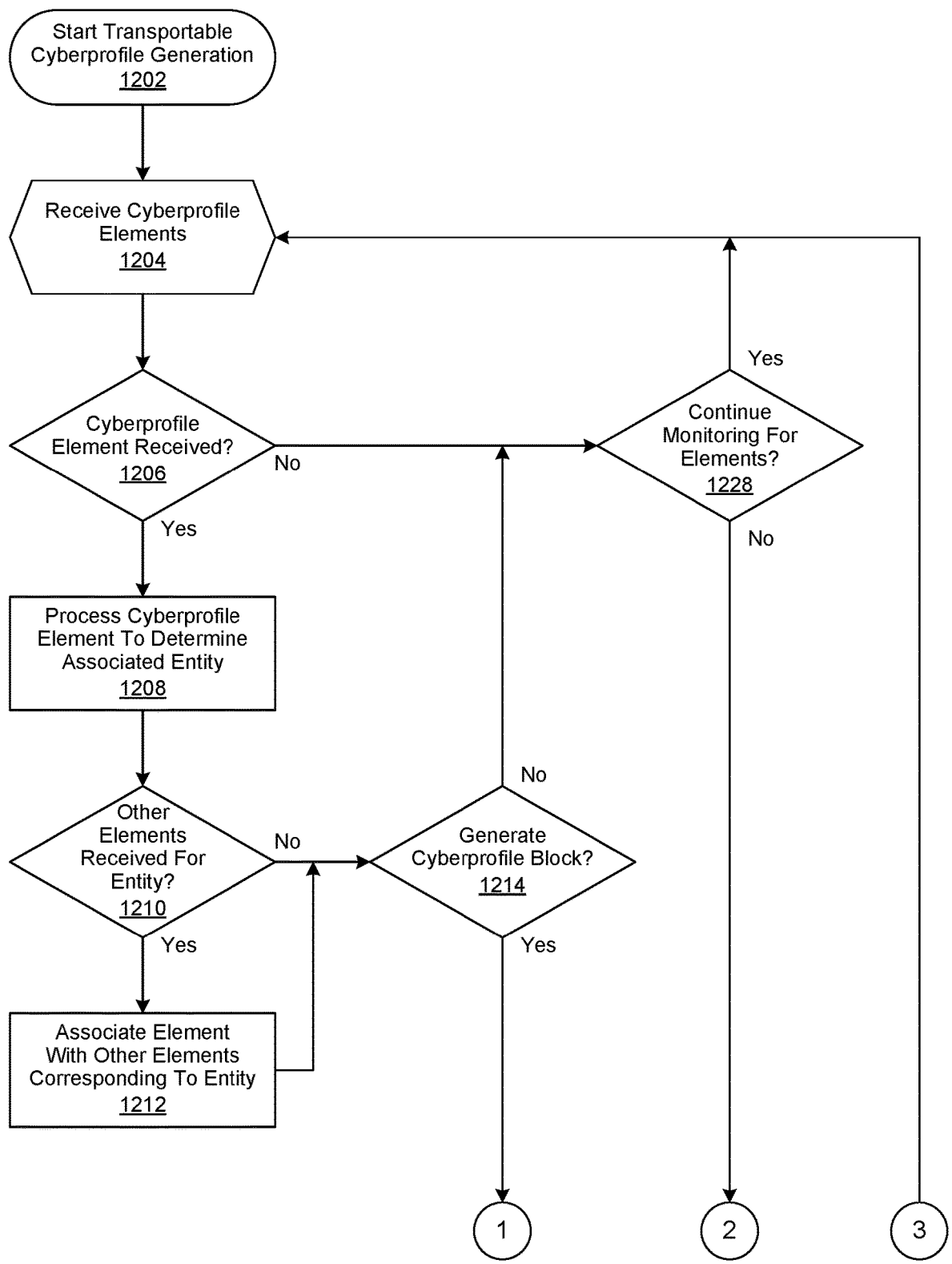
FIGS. 12a and 12b are a generalized flowchart of the performance of transportable cyberprofile generation operations.
Figure 12B:
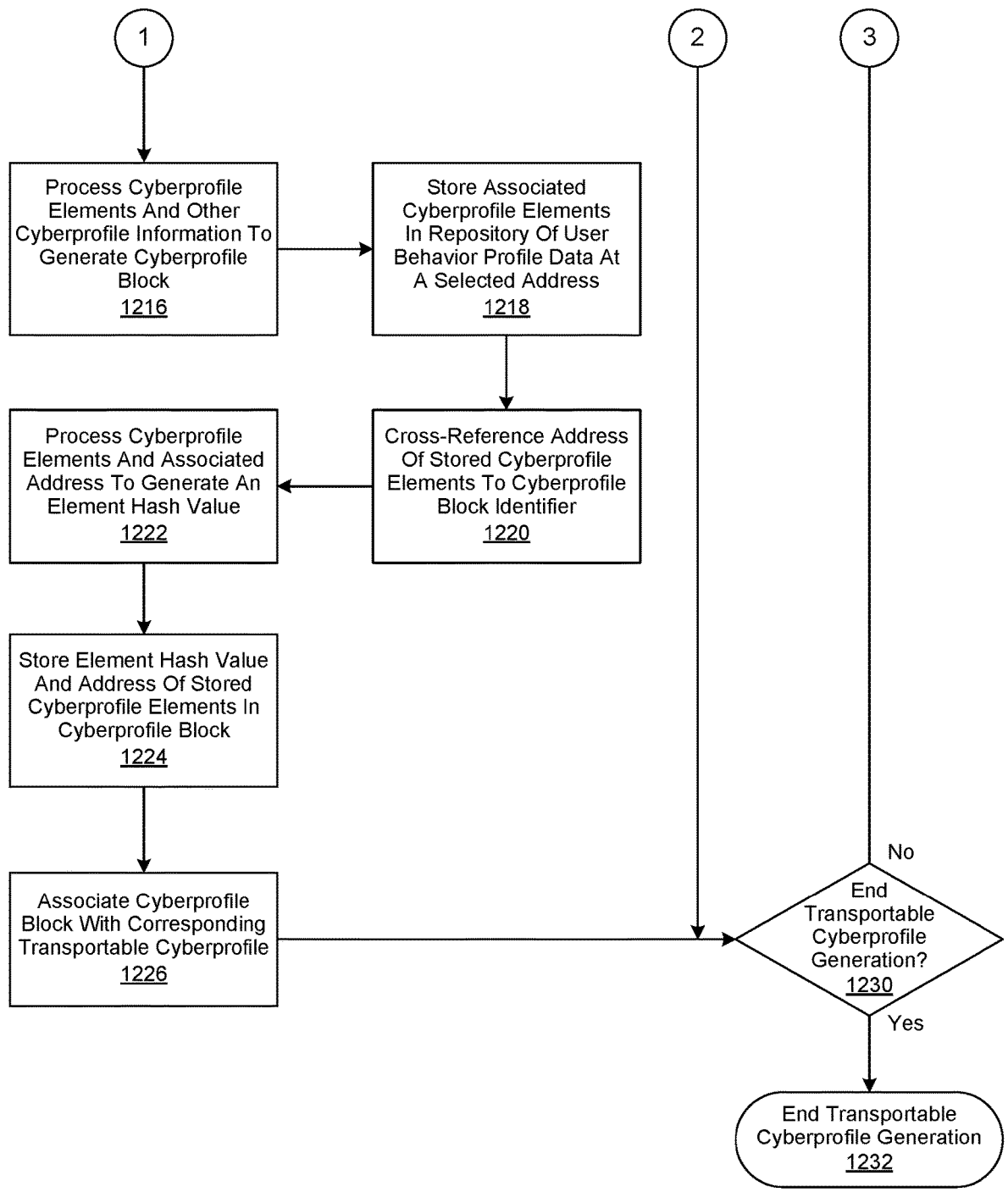

FIGS. 12*a* and 12*b* are a generalized flowchart of the performance of transportable cyberprofile generation operations implemented in accordance with an embodiment of the invention. In this embodiment, transportable cyberprofile generation operations are begun in step 1202, followed by ongoing operations being performed by a blockchain access management system in step 1204 to receive cyberprofile elements, as described in greater detail herein. A determination is then made in step 1206 whether a cyberprofile element has been received by the blockchain access management system.

If not, then a determination is made in step 1228 to determine whether to continue ongoing operations to receive cyberprofile elements. If so, then the process is continued, proceeding with step 1204. Otherwise, a determination is made in step 1230 whether to end transportable cyberprofile generation operations. If not, then the process is continued, proceeding with step 1204. Otherwise, transportable cyberprofile generation operations are ended in step 1232.

However, if it was determined in step 1206 that a cyberprofile element was received, then it is processed in step 1208 to determine its associated entity. A determination is then made in step 1210 to determine whether other cyberprofile elements associated with the same entity have been received by the blockchain access management system. If so, then the most recently received cyberprofile element is associated with the other cyberprofile elements corresponding to the same entity in step 1212.

Thereafter, or if it was determined in step 1210 that no other cyberprofile elements corresponding to the entity have been received, then a determination is made in step 1214 whether to generate a cyberprofile block, described in greater detail herein. If not, then the process is continued, proceeding with step 1228. Otherwise, the cyberprofile elements corresponding to the same entity are processed in step 1216 with any other related cyberprofile information, likewise described in greater detail herein, to generate a cyberprofile block.

Then, in step 1218, the cyberprofile elements associated with the resulting cyberprofile block are stored in a repository of user behavior profile data at a selected address. The selected address for the cyberprofile elements are then cross-referenced, or otherwise indexed, to the cyberprofile block's identifier in step 1220. The cyberprofile elements are then processed in step 1222 with their corresponding address to generate an element hash value, described in greater detail herein. The resulting element hash value, and the address of the stored cyberprofile elements, are then stored in the cyberprofile block in step 1224. The cyberprofile block is then processed in step 1226 to associate it with its corresponding transportable cyberprofile. The process is then continued, proceeding with step 1230.

Figure 13:
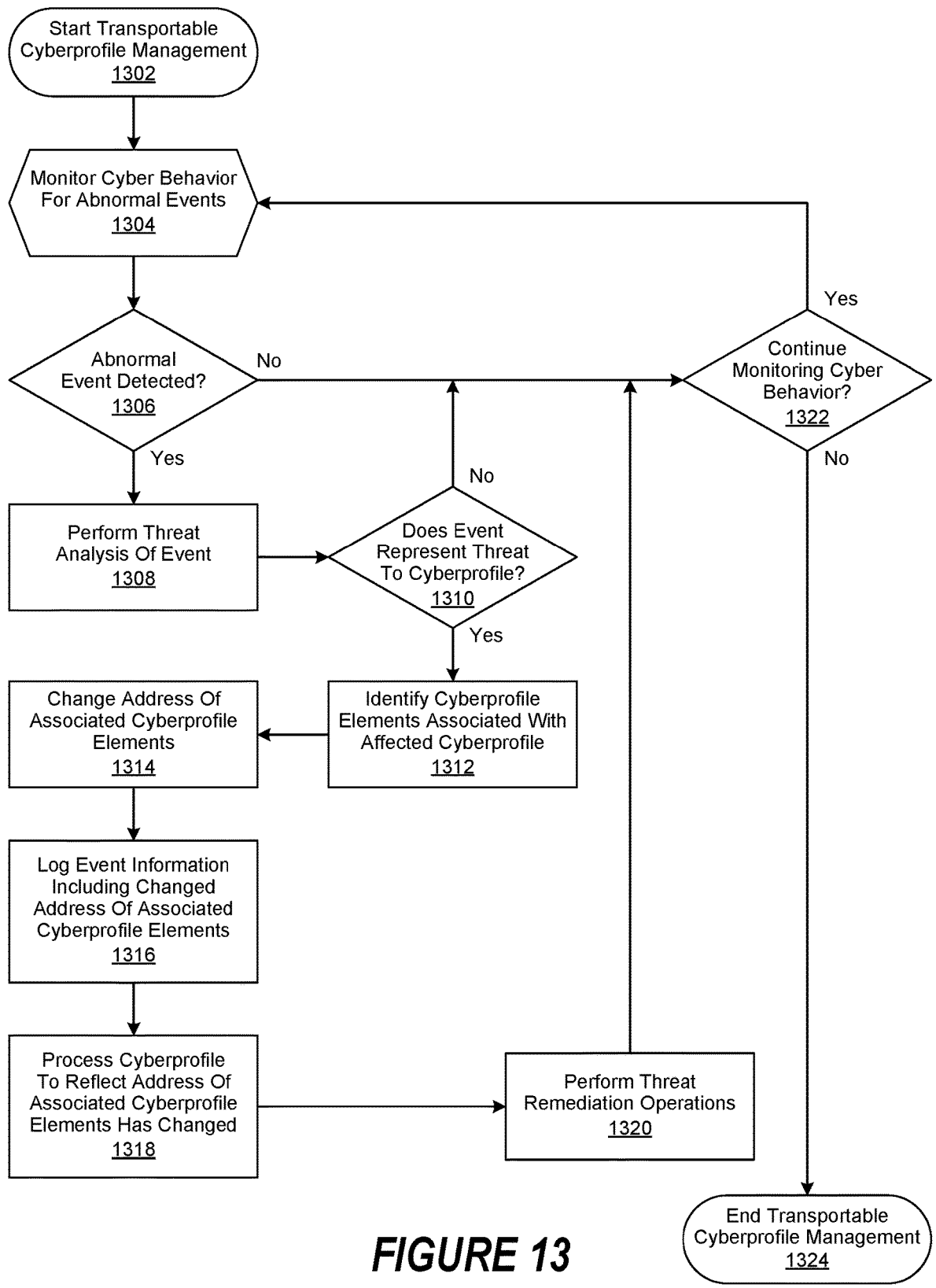
FIG. 13 is a generalized flowchart of the performance of transportable cyberprofile management operations.

FIG. 13 is a generalized flowchart of the performance of transportable cyberprofile management operations implemented in accordance with an embodiment of the invention. In this embodiment, transportable cyberprofile management operations are begun in step 1302, followed by ongoing operations being performed in step 1304 to monitor cyber behavior for abnormal events, such as a data breach or a cyberprofile being compromised. A determination is then made in step 1306 whether an abnormal event has been detected. If not, then a determination is made in step 1322 whether to continue ongoing operations to monitor cyber behavior for abnormal events. If so, then the process is continued, proceeding with step 1304.

However, if it was determined in step 1306 that an abnormal event was detected, then threat analysis operations are performed in step 1308, followed by a determination being made in step 1310 if the abnormal event represents a threat to a particular cyberprofile. If not, then the process is continued, proceeding with step 1322. Otherwise, cyberprofile elements associated with the affected cyberprofile are identified in step 1312. The address referencing the storage location of the associated cyberprofile elements are then changed in step 1314, followed by information related to the abnormal event, and the changed address of the cyberprofile elements, being logged in step 1316. In certain embodiments, the changing of the address of the cyberprofile elements, and the logging of the information related to the abnormal event, may be performed by a blockchain access management system, described in greater detail herein. The cyberprofile is then processed in step 1318 to reflect that the address of its associated cyberprofile elements has been changed. Threat remediation operations are then performed in step 1320 and the process is continued, proceeding with step 1322.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for monitoring user behavior, comprising:
    monitoring electronically-observable user behavior of an entity, the electronically-observable user behavior comprising interactions between a user and a user device, interactions between the user and a network and interactions between the user and a resource, the electronically-observable user behavior comprising a behavior exhibited by the user that is observed through the use of at least one of an electronic device, a computer system and a software application executing on the computing system;
    generating a user behavior profile based upon the electronically-observable user behavior, the user behavior profile comprising a user behavior element, the user behavior element comprising a discrete element representing a behavior of a user during performance of a particular operation, the user behavior element comprising at least one of a representation of a known good interaction between the user and the user device and a representation of an anomalous interaction between the user and the user device;
    storing the user behavior profile within a user behavior profile repository;
    identifying an anomalous user behavior interaction between the user and the user device based upon the representation of the anomalous interaction between the user and the user device;
    generating a risk score based upon the anomalous user behavior interaction;
    associating the risk score within the user behavior profile;
    assessing a risk of the entity based upon the risk score, the risk score being used by a user behavior monitoring system to assess a state of the entity when enacting a given user behavior; and,
    responding, via the user behavior monitoring system, with an associated response based upon the risk of the entity, the associated response adaptively responding based upon the risk of the entity; and wherein
    the generating the user behavior profile comprises associating the interactions between the user and the user device, interactions between the user and a network and interactions between the user and a resource with a respective user behavior element; and,
    the user behavior profile comprises a multi-layered user behavior profile, each layer of the multi-layered user behavior profile corresponding to a respective interaction.

2. The method of claim 1, wherein:
the user behavior profile comprises a plurality of user behavior elements.

3. The method of claim 1, wherein:
the associated response comprises a threat remediation action, the threat remediation action comprising at least one of blocking the user, modifying a request submitted by the user, modifying an outcome and encrypting a file when a copy operation is detected.

4. The method of claim 1, wherein:
the associated response is performed when the behavior of the user is identified as malicious.

5. The method of claim 1, wherein:
the associated response is additive to a previous associated action.

6. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
    monitoring electronically-observable user behavior of an entity, the electronically-observable user behavior comprising interactions between a user and a user device, interactions between the user and a network and interactions between the user and a resource, the electronically-observable user behavior comprising a behavior exhibited by a user that is observed through the use of at least one of an electronic device, a computer system and a software application executing on the computing system;

converting the electronically-observable user behavior of the entity into electronic information representing the electronically-observable user behavior;

generating a user behavior profile based upon the electronic information representing the electronically-observable user behavior, the user behavior profile comprising a user behavior element, the user behavior element comprising a discrete element representing a behavior of a user during performance of a particular operation, the user behavior element comprising at least one of a representation of a known good interaction between the user and the user device and a representation of an anomalous interaction between the user and the user device;

identifying an anomalous user behavior interaction between the user and the user device based upon the representation of the anomalous interaction between the user and the user device;

generating a user behavior profile score and a hash based upon the anomalous user behavior interaction;

storing the user behavior profile score and the hash within the user behavior profile;

assessing a risk of the entity based upon user behavior profile score; and, responding, via a user behavior monitoring system, with an associated response based upon the risk of the entity, the associated response adaptively responding based upon the risk of the entity; and wherein the generating the user behavior profile comprises associating the interactions between the user and the user device, interactions between the user and a network and interactions between the user and a resource with a respective user behavior element; and, the user behavior profile comprises a multi-layered user behavior profile, each layer of the multi-layered user behavior profile corresponding to a respective interaction.

7. The system of claim 6, wherein the user behavior profile comprises a plurality of user behavior elements.

8. The system of claim 6, wherein:
the associated response comprises a threat remediation action, the threat remediation action comprising at least one of blocking the user, modifying a request submitted by the user, modifying an outcome and encrypting a file when a copy operation is detected.

9. The system of claim 6, wherein:
the associated response is performed when the behavior of the user is identified as malicious.

10. The system of claim 6, wherein:
the associated response is additive to a previous associated action.

11. A non-transitory, computer-readable storage medium embodying computer program code, the computer program code comprising computer executable instructions configured for:

monitoring electronically-observable user behavior of an entity, the electronically-observable user behavior comprising interactions between a user and a user device, interactions between the user and a network and interactions between the user and a resource, the electronically-observable user behavior comprising a behavior exhibited by a user that is observed through the use of at least one of an electronic device, a computer system and a software application executing on the computing system;

converting the electronically-observable user behavior of the entity into electronic information representing the electronically-observable user behavior;

generating a user behavior profile based upon the electronic information representing the electronically-observable user behavior, the user behavior profile comprising a user behavior element, the user behavior element comprising a discrete element representing a behavior of a user during performance of a particular operation, the user behavior element comprising at least one of a representation of a known good interaction between the user and the user device and a representation of an anomalous interaction between the user and the user device;

identifying an anomalous user behavior interaction between the user and the user device based upon the representation of the anomalous interaction between the user and the user device;

generating a user behavior profile score and a hash based upon the anomalous user behavior interaction;

storing the user behavior profile score and the hash within the user behavior profile;

assessing a risk of the entity based upon the user behavior profile score; and, responding, via a user behavior monitoring system, with an associated response based upon the risk of the entity, the associated response adaptively responding based upon the risk of the entity; and wherein the generating the user behavior profile comprises associating the interactions between the user and the user device, interactions between the user and a network and interactions between the user and a resource with a respective user behavior element; and, the user behavior profile comprises a multi-layered user behavior profile, each layer of the multi-layered user behavior profile corresponding to a respective interaction.

12. The non-transitory, computer-readable storage medium of claim 11, wherein the user behavior profile comprises a plurality of user behavior elements.

13. The non-transitory, computer-readable storage medium of claim 11, wherein:
the associated response comprises a threat remediation action, the threat remediation action comprising at least one of blocking the user, modifying a request submitted by the user, modifying an outcome and encrypting a file when a copy operation is detected.

14. The non-transitory, computer-readable storage medium of claim 11, wherein:
the associated response is performed when the behavior of the user is identified as malicious.

15. The non-transitory, computer-readable storage medium of claim 14, wherein:
the associated response is additive to a previous associated action.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *